(12) United States Patent
Wei et al.

(10) Patent No.: US 11,483,132 B2
(45) Date of Patent: Oct. 25, 2022

(54) GENERATING AND INITIATING PRE-SIGNED TRANSACTION REQUESTS FOR FLEXIBLY AND EFFICIENTLY IMPLEMENTING SECURE CRYPTOGRAPHIC KEY MANAGEMENT

(71) Applicant: Meta Platforms, Inc., Menlo Park, CA (US)

(72) Inventors: Lei Wei, Los Altos Hills, CA (US); Riyaz Faizullabhoy, Los Altos, CA (US); Nassim Eddequiouaq, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 167 days.

(21) Appl. No.: 17/112,522

(22) Filed: Dec. 4, 2020

(65) Prior Publication Data
US 2022/0182222 A1 Jun. 9, 2022

(51) Int. Cl.
| | |
|---|---|
| *H04L 9/06* | (2006.01) |
| *G06F 16/9035* | (2019.01) |
| *H04L 9/08* | (2006.01) |
| *H04L 9/00* | (2022.01) |
| *H04L 9/32* | (2006.01) |

(52) U.S. Cl.
CPC ........ *H04L 9/0643* (2013.01); *G06F 16/9035* (2019.01); *H04L 9/0819* (2013.01); *H04L 9/0866* (2013.01); *H04L 9/50* (2022.05)

(58) Field of Classification Search
CPC ... H04L 9/0643; H04L 9/0819; H04L 9/0866; H04L 9/50; H04L 2209/76; H04L 9/0891; H04L 9/0894; H04L 9/3247; H04L 9/3239; G06F 16/9035
See application file for complete search history.

(56) References Cited

U.S. PATENT DOCUMENTS 9,407,437 B1 * 8/2016 Campagna ................ H04L 9/16
11,200,569 B1 * 12/2021 James .................. G06Q 20/381
(Continued)

FOREIGN PATENT DOCUMENTS

WO WO-2019210409 A1 11/2019

OTHER PUBLICATIONS

International Search Report and Written Opinion for International Application No. PCT/US2021/061920, dated Apr. 4, 2022, 8 pages.

*Primary Examiner* — Darren B Schwartz
(74) *Attorney, Agent, or Firm* — Keller Preece PLLC

(57) ABSTRACT

The present disclosure relates to systems, methods, and non-transitory computer-readable media that utilize pre-signed key rotation transaction requests for initiating transactions to rotate one or more cryptographic keys of a user account of a distributed digital ledger transaction network. For example, in one or more embodiments, the disclosed systems initiate a transaction to delegate a permission for rotating one or more cryptographic keys of a first user account to a second user account. Using the second user account, the disclosed systems generate and store a pre-signed key rotation transaction request. By retrieving the pre-signed key rotation transaction request from storage, the disclosed systems can initiate a key rotation transaction that exchanges the active cryptographic key of the first user account to a modified cryptographic key.

20 Claims, 13 Drawing Sheets

(56) References Cited

U.S. PATENT DOCUMENTS

| | | | |
|---|---|---|---|
| 2014/0161260 A1* | 6/2014 | Wu | H04L 9/083 |
| | | | 380/278 |
| 2017/0034141 A1* | 2/2017 | Oberheide | H04L 9/30 |
| 2018/0060596 A1* | 3/2018 | Hamel | G06F 21/62 |
| 2018/0075536 A1* | 3/2018 | Jayaram | G06Q 20/26 |
| 2018/0096163 A1* | 4/2018 | Jacques de Kadt | G06Q 10/087 |
| 2019/0028278 A1* | 1/2019 | Gilson | H04L 9/0618 |
| 2019/0266576 A1* | 8/2019 | McCauley | G06Q 20/42 |
| 2019/0297065 A1* | 9/2019 | Kanungo | H04L 9/0891 |
| 2019/0392511 A1 | 12/2019 | Mahajan et al. | |
| 2020/0202349 A1* | 6/2020 | Bougalis | H04L 9/0637 |
| 2020/0204338 A1* | 6/2020 | Bougalis | H04L 9/3239 |
| 2020/0334674 A1 | 10/2020 | Youngblood et al. | |
| 2021/0119807 A1* | 4/2021 | Chen | H04L 9/3239 |
| 2021/0182806 A1* | 6/2021 | Ornelas | G06Q 20/3825 |

\* cited by examiner

GENERATING AND INITIATING PRE-SIGNED TRANSACTION REQUESTS FOR FLEXIBLY AND EFFICIENTLY IMPLEMENTING SECURE CRYPTOGRAPHIC KEY MANAGEMENT

BACKGROUND

Recent years have seen significant development in hardware and software platforms for implementing and interacting with distributed digital ledgers managed across computer networks. Indeed, as systems managing these distributed digital ledgers (often known as "blockchain" systems) have grown in prominence and complexity, engineers have developed platforms for exchanging digital assets among associated user accounts by processing digital transactions across distributed nodes of a computer network. For example, conventional systems manage and utilize cryptographic keys to securely authorize the transfer of digital assets between user accounts across a blockchain system. In particular, such cryptographic key management systems (often referred to as "hardware security modules" or "crypto wallets") utilize the cryptographic keys of a given user account to "sign" a transaction request or otherwise indicate that the user account has authorized a transaction request submitted to the blockchain system to initiate the transfer.

Despite these advances, however, conventional cryptographic key management systems suffer from several technological shortcomings that undermine the efficiency, flexibility, and security of the implementing computing devices and corresponding blockchain systems. For example, conventional cryptographic key management systems are often inefficient. In particular, because cryptographic keys enable the transfer of valuable digital assets, conventional systems typically store the cryptographic key of a user account in a storage location that is difficult and time consuming to access, such as a cold storage location (e.g., an offline storage location). Accordingly, such conventional systems are inefficient at accessing and utilizing the cryptographic key to authorize transaction requests.

In addition to problems with efficiency, conventional cryptographic key management systems are often inflexible in how they respond to malicious actors. Indeed, due to the value of the digital assets exchanged across blockchain systems, user accounts are often susceptible to attacks from malicious third-party actors. To illustrate, third-party actors may take control of a user account by manually changing the cryptographic key used to authorize transactions requests. Accordingly, these third-party actors can submit transaction requests on behalf of a user account while preventing the owner of the user account from doing so. Conventional systems often fail, however, to provide robust features for flexibly responding to such third-party attacks or even to prevent such attacks all together.

Accordingly, conventional cryptographic key management systems are typically unsecure. Indeed, by failing to address the possibility of third-party actors gaining control of user accounts, conventional systems fail to provide security against the owners of user accounts being locked out from their respective accounts as the cryptographic keys implemented by the third-party actors are unknown. Further, by failing to address the possibility of these attacks, conventional systems fail to provide security against the loss of digital assets associated with a user account.

Additional security failings of conventional cryptographic key management systems relate to the processing of transaction requests themselves. For example, conventional systems often fail to protect against third-party actors submitting a previously-authorized transaction request for iterative execution. Further, conventional systems fail to offer secure protections against third-party actors attempting to fraudulently initiate transactions based on falsified user account balances, such as by passing off previous account balances as the current balances.

The foregoing drawbacks, along with additional technical problems and issues, exist with regard to conventional cryptographic key management systems.

SUMMARY

One or more embodiments described herein provide benefits and/or solve one or more of the foregoing or other problems in the art with systems, methods, and non-transitory computer-readable media that flexibly generate pre-signed key rotation transaction requests utilizing user accounts having delegated permissions for efficient and secure cryptographic key management. Indeed, in one or more embodiments, the disclosed systems delegate a permission to rotate one or more cryptographic keys of a first user account of a blockchain system to a second user account (e.g., in anticipation of interference with the cryptographic keys by a malicious actor). In some implementations, the cryptographic key of the second user account is stored in a secure, difficult-to-access storage location. Accordingly, the disclosed systems can utilize the second user account to pre-sign a transaction request for rotating the cryptographic keys of the first user account and store the pre-signed transaction request in a comparatively accessible storage location for expeditious submission to the blockchain system. In some case, the disclosed systems can further utilize the second user account to pre-sign a transaction request to freeze the first user account, disabling transactions from that user account until desired (e.g., the cryptographic keys have been rotated). In this manner, the disclosed systems improve the security of cryptographic keys of a user account by providing a flexible and efficient response to third-party interferences. In some implementations, the disclosed systems provide additional securities by storing the root hash of one or more authenticated data structures maintained by the blockchain system to prevent the iterative replay of previously-authorized transactions or fraudulent transactions initiated based on outdated user account balances.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
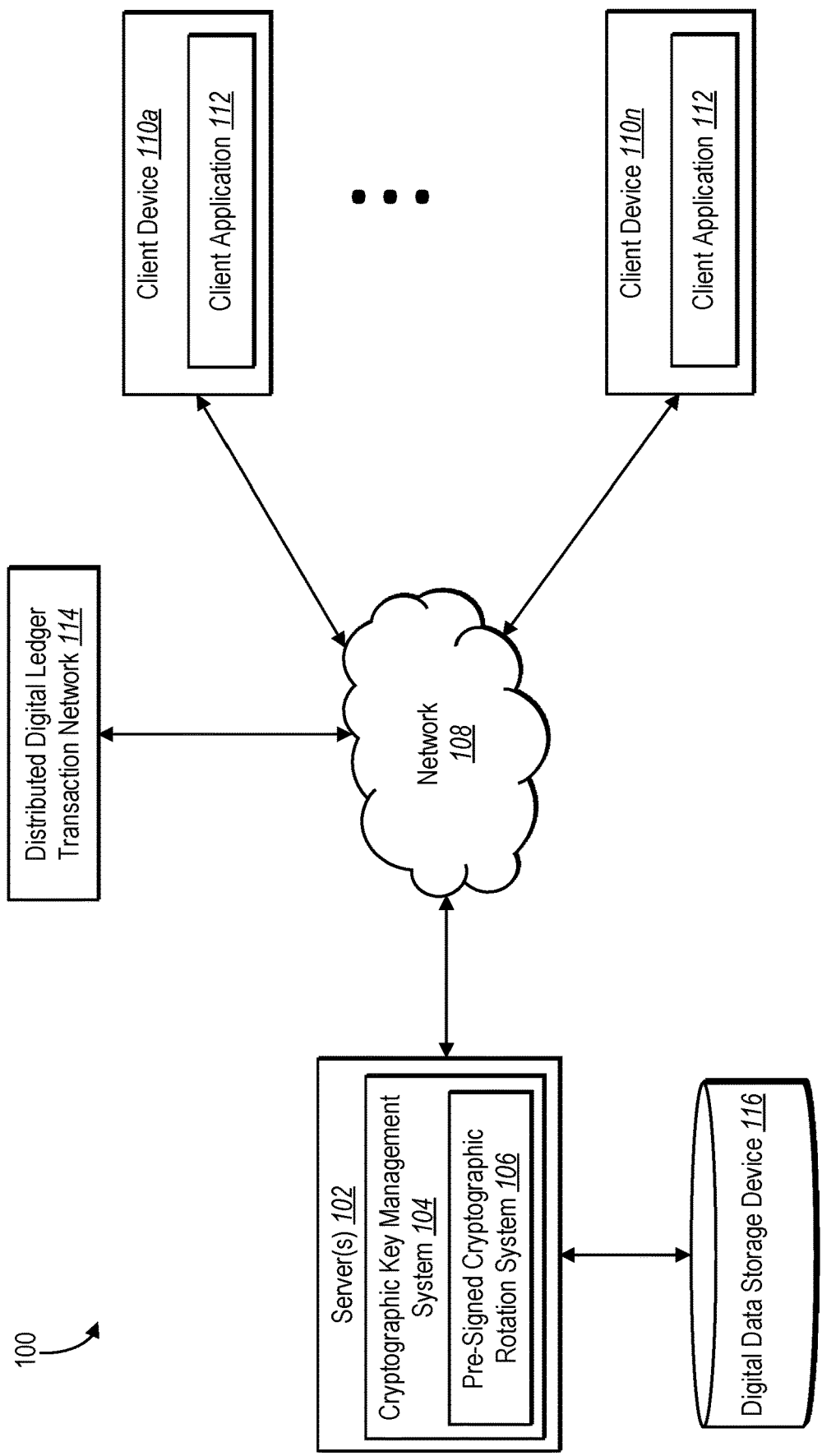
FIG. 1 illustrates an example environment in which a pre-signed cryptographic rotation system can operate in accordance with one or more embodiments.

One or more embodiments described herein include a pre-signed cryptographic rotation system that flexibly generates and implements pre-signed transaction requests to efficiently rotate the cryptographic keys of a blockchain system user account for increased security. For example, in one or more embodiments, the pre-signed cryptographic rotation system delegates a permission that enables a second user account of a blockchain system to initiate a transaction rotating one or more cryptographic keys of a first user account. The pre-signed cryptographic rotation system further utilizes the second user account to generate a pre-signed transaction request for rotating the cryptographic keys of the first user account. The pre-signed cryptographic rotation system can store the pre-signed transaction request in a location that is more accessible than the cryptographic key of the second user account, which may be stored in cold storage (e.g., offline). Accordingly, the pre-signed cryptographic rotation system can quickly access the pre-signed transaction request to initiate rotation of the cryptographic keys of the first user account, such as in response to determining that a malicious actor has accessed the cryptographic keys of the first user account. In some implementations, the pre-signed cryptographic rotation system further stores, locally, the root hash of one or more authenticated data structures of the blockchain system to verify the freshness of the authenticated data structures and/or prevent the replay of previously-authorized transactions.

To provide an illustration, in one or more embodiments, the pre-signed cryptographic rotation system initiates a transaction, via a distributed digital ledger transaction network, delegating a permission to rotate cryptographic keys of a first user account of the distributed digital ledger transaction network to a second user account of the distributed digital ledger transaction network. Additionally, the pre-signed cryptographic rotation system utilizes a cryptographic key of the second user account to generate a pre-signed key rotation transaction request to generate a modified cryptographic key for the first user account based on delegation of the permission to the second user account. The pre-signed cryptographic rotation system stores the pre-signed key rotation transaction request in a first digital data storage location that is different than a second digital data storage location storing the cryptographic key of the second user account. Accordingly, the pre-signed cryptographic rotation system can initiate a key rotation transaction, via the distributed digital ledger transaction network, exchanging an active cryptographic key for the first user account to the modified cryptographic key for the first user account by accessing the pre-signed key rotation transaction request from the second digital data storage location.

As just mentioned, in one or more embodiments, the pre-signed cryptographic rotation system delegates a permission to rotate the cryptographic keys of a first user account to a second user account. For example, in one or more embodiments, the pre-signed cryptographic rotation system utilizes an active (e.g., currently active) cryptographic key of the first user account to generate a transaction request for delegating the permission to the second user account. The pre-signed cryptographic rotation system can further submit the transaction request to the distributed digital ledger transaction network to implement the delegation.

As further mentioned, in one or more instances, based on the delegation of the permission, the pre-signed cryptographic rotation system utilizes a cryptographic key of the second user account to generate a pre-signed key rotation transaction request to generate a modified cryptographic key for the first user account. In particular, the pre-signed key rotation transaction request includes a transaction request for exchanging the active cryptographic key of the first user account (e.g., the cryptographic key that is currently active at the time the corresponding transaction is initiated) for a modified cryptographic key.

As mentioned, in some implementations, the pre-signed cryptographic rotation system stores the pre-signed key rotation transaction request in a first digital data storage location that is different than a second digital data storage location storing the cryptographic key of the second user account. For example, in some implementations, the cryptographic key of the second user account is stored in a digital data storage location that is associated with a high data retrieval time, such as a cold storage location. Thus, the pre-signed cryptographic rotation system can store the pre-signed key rotation transaction request in a digital data storage location that is associated with a relatively lower data retrieval time to allow for quicker access.

Accordingly, in one or more embodiments, the pre-signed cryptographic rotation system accesses the pre-signed key rotation transaction request from its respective digital data storage location to initiate a key rotation transaction. For example, the pre-signed cryptographic rotation system can submit the pre-signed key rotation transaction request to the distributed digital ledger transaction network to initiate an exchange of the active cryptographic key for the first user account (e.g., the cryptographic key that is active at the time the key rotation transaction is initiated) for a modified cryptographic key.

The pre-signed cryptographic key rotation system can initiate a key rotation transaction in response to a variety of triggering events. In some implementations, the pre-signed cryptographic key rotation system initiates the key rotation transaction in response to determining that a third-party actor that is unassociated with the first or second user accounts has accessed a cryptographic key of the first user account. In some cases, the pre-signed cryptographic key rotation system initiates the key rotation transaction based on a predetermined time for rotation of cryptographic keys.

Additionally, in some instances, the pre-signed cryptographic key rotation system generates additional pre-signed transaction requests for implementation of corresponding transactions via the distributed digital ledger transaction network. For example, in some cases, the pre-signed cryptographic key rotation system utilizes the second user account to generate a pre-signed transaction request for freezing (e.g., de-activating) the first user account. Accordingly, the pre-signed cryptographic key rotation system can implement a corresponding transaction to prevent the transfer of digital assets from the first user account until re-activated.

In some implementations, the pre-signed cryptographic key rotation system delegates a permission to rotate the cryptographic keys of multiple user accounts to a single user account of the distributed digital ledger transaction network. For example, the pre-signed cryptographic key rotation system can delegate permissions to rotate the cryptographic keys of a first user account and a second user account to a third user account. Accordingly, the pre-signed cryptographic key rotation system can utilize the third user account to generate multiple pre-signed key rotation transaction requests for the first and second user accounts having duplicated sequence numbers so that a pre-signed key rotation transaction request with the correct sequence number is available for submission to the distributed digital ledger transaction network when needed.

In one or more embodiments, the pre-signed cryptographic key rotation system further stores the root hash of one or more authenticated data structures managed by the distributed digital ledger transaction network. For example, the pre-signed cryptographic key rotation system can locally store the root hash of an authenticated data structure storing user account information to verify the freshness of the authenticated data structure. Further, the pre-signed cryptographic rotation system can locally store the root hash of an authenticated data structure storing transaction information to validate the authenticated data structure, which may exist outside of an inherent boundary of trust. Once validated, the pre-signed cryptographic rotation system can utilize the authenticated data structure to prevent the replay of previously-authorized transactions.

The pre-signed cryptographic rotation system provides several advantages over conventional systems. For example, the pre-signed cryptographic rotation system operates more efficiently than conventional systems. Indeed, by storing a pre-signed key rotation transaction request in a digital data storage location having a relatively low data retrieval time, the pre-signed cryptographic rotation system can quickly access the pre-signed key rotation transaction request. Accordingly, the pre-signed cryptographic rotation system can more efficiently initiate the corresponding key rotation transaction. As one particular example, the pre-signed cryptographic rotation system can quickly respond to a third-party actor accessing a cryptographic key of a user by efficiently initiating a key rotation transaction and preventing the loss of digital assets held by that user account.

Further, the pre-signed cryptographic rotation system operates more flexibly than conventional systems. Indeed, by delegating permission to rotate the cryptographic keys of a user account and generating a pre-signed key rotation transaction request using the cryptographic key of the user account having the delegated permission, the pre-signed cryptographic rotation system provides robust features for flexibly responding to third-party attacks. In some instances, the pre-signed key rotation transaction request can flexibly prevent third-party attacks.

Accordingly, the flexibility and efficiency enable the pre-signed cryptographic rotation system to provide improved security when compared to conventional systems. Indeed, by delegating permission to rotate the cryptographic keys of a first user account to a second user account, the pre-signed cryptographic rotation system provides improved security that can enable the owner of a user account to regain control after having lost it due to a third-party attack. Further, by utilizing a pre-signed key rotation transaction request for expedient initiation of a key rotation transaction, the pre-signed cryptographic rotation system can provide improved security against the loss (or, at least, the major loss) of digital assets held by a user account.

Further, by storing the root hash of one or more authenticated data structures managed by the distributed digital ledger transaction network, the pre-signed cryptographic rotation system can provide security against the iterative replay of previously-authorized transactions or fraudulent transactions initiated based on outdated user account balances.

As illustrated by the foregoing discussion, the present disclosure utilizes a variety of terms to describe features and benefits of the pre-signed cryptographic rotation system. Additional detail is now provided regarding the meaning of these terms. For example, as used herein, the term "distributed digital ledger transaction network" refers to a network of computing devices for maintaining a distributed digital ledger. In particular, a distributed digital ledger transaction network can include a collection of computing devices, associated peripherals, communication protocols, and communication mediums that can implement and/or interact with a system (e.g., a blockchain system) implementing a distributed digital ledger. For example, a distributed digital ledger transaction network can include one or more client devices and computer nodes communicating via a network to implement and/or interact with the system implementing the distributed digital ledger.

Additionally, as used herein, the term "user account" refers to an account of the distributed digital ledger transaction network. In particular, a user account can refer to a collection of code and/or data stored within a data structure (e.g., an authenticated data structure) of the distributed digital ledger transaction network. A user account can be associated with a client device of a user of the distributed digital ledger transaction network but is not limited to such an account. For example, a user account can also include an administrative account, or an account otherwise used to store code or data unassociated with a particular user. Similarly, a user account can correspond to custodial wallets that act on behalf of their users.

Further, as used herein, the term "transaction request" refers to a request corresponding to a transaction (e.g., a request to execute or commit a transaction to the distributed digital ledger). In particular, a transaction request can refer to a transmission, received by a computer node of the distributed digital ledger transaction network, requesting execution of a transaction via the distributed digital ledger transaction network. A transaction request can include a transaction to be executed (e.g., a transfer of digital assets to be made). In some embodiments, a transaction request includes additional detail, such as a transaction identifier corresponding to the requested transaction, an account address of the sending user account, a public key of the sending user account, etc.

Relatedly, as used herein, the term "pre-signed key rotation transaction request" includes a pre-signed transaction request for rotating the cryptographic keys of a user account. In particular, a pre-signed key rotation transaction request can include a transaction request for rotating cryptographic keys that is signed prior to (e.g., a significant time before) submitting the transaction request to the distributed digital ledger transaction network for execution or commitment to the distributed digital ledger. For example, a pre-signed key rotation transaction request can include a transaction request for rotating cryptographic keys that is signed (e.g., encrypted using a cryptographic key of a user account) and then stored for later access and submission to the distributed digital ledger transaction network (e.g., that is stored and then executed upon detecting a triggering event). As used herein, the term "non-expiring pre-signed key rotation transaction request" refers to a pre-signed key rotation transaction request that is valid indefinitely (e.g., without expiration).

As used herein, the term "transaction" refers to an action performed via the distributed digital ledger transaction network. In particular, a transaction can include the performance of at least one operation (e.g., by a computer node of the distributed digital ledger transaction network) that modifies the state of the distributed digital ledger transaction network. For example, a transaction can include a transfer of one or more digital assets between user accounts or a rotation of cryptographic keys of a user account (e.g., transferring permissions to one or more accounts to rotate cryptographic keys). Indeed, as used herein the term "key rotation transaction" refers to a transaction that, when performed, exchanges a cryptographic key of a user account for a different cryptographic key.

Additionally, as used herein, the term "cryptographic key" refers to information used for identifying a user account and/or encrypting/decrypting digital data. In particular, a cryptographic key can include a value or a set of values that are uniquely associated with a user account. In some instances, a cryptographic key refers to information (e.g., an algorithm) that specifies an output for a given input (e.g., specifies how data is encrypted). To illustrate, a cryptographic key can include a public key (e.g., a publicly visible cryptographic key), a private key (e.g., a privately kept cryptographic key), or an authentication key (which can be comprised of the address of the user account or a hash value resulting from applying a hash function to a public key or a private key of the user account). In one or more embodiments, the pre-signed cryptographic rotation system utilizes the cryptographic key (e.g., the private key) of a user account to sign a transaction request submitted to the distributed digital ledger transaction network for the user account. In some implementations, the pre-signed cryptographic rotation system references the cryptographic key (e.g., the authentication key) in a transaction request for authentication of the user account by the distributed digital ledger transaction network (e.g., for verification that the user account is authorized to send the transaction request).

As used herein, the term "active cryptographic key" refers to a cryptographic key that is active (e.g., valid) for a user account at a given instance of time. In particular, an active cryptographic key can refer to the cryptographic key that is currently valid for signing or authenticating transaction requests. Relatedly, as used herein, the term "modified cryptographic key" refers to a cryptographic key that is made newly active for a user account, such as by a key rotation transaction. A modified cryptographic key can include a modified version of the active cryptographic key associated with the user account at the time the key rotation transaction was initiated, a modified version of a cryptographic key previously associated with the user account, a modified version of some other cryptographic key, or a newly generated cryptographic key.

Further, as used herein, the term "permission" refers to an authority, clearance, or authorization right of a user account. In particular, a permission refers to an authority enabling a user account to initiate a particular action via the distributed digital ledger transaction network that can be delegated to another user account. For example, a permission can include an authority to initiate a key rotation transaction to rotate the cryptographic keys of a first user account, which can be maintained by the first user account or delegated to a second user account.

As used herein, the term "digital data storage location" refers to a location for storing digital data. In particular, a digital data storage location refers to a location (e.g., a digital location contained within physical media) for storing digital data associated with a user account. For example, a digital data storage location can include a location for storing a cryptographic key associated with a user account or a pre-signed key rotation transaction request generated for a user account. A digital data storage location can refer to a location that is local to the pre-signed cryptographic rotation system (e.g., internal to the computing device implementing the pre-signed cryptographic rotation system) or a location that is external to the pre-signed cryptographic rotation system (e.g., a location associated with an external database, a third-party system, or another computing device or peripheral, such as a thumb drive or dedicated crypto wallet). In some implementations, a digital data storage location refers to a cold storage location. As used herein, the term "cold storage location" (or "cold storage") refers to a secure and relatively inaccessible digital data storage location (e.g., inaccessible to at least some computing systems). For example, a cold storage location can refer to a digital data storage location that is offline (e.g., inaccessible via a network). To illustrate, a cold storage location can include an offline crypto wallet or other form of storage that is disconnected from a network. Accordingly, in some implementations, cold storage locations are associated with relatively high data retrieval times.

Additionally, as used herein, the term "data retrieval time" refers to a time required to retrieve digital data from a digital data storage location. For example, a data retrieval time can refer to a time required to retrieve a cryptographic key or a pre-signed key rotation transaction request from a digital data storage location storing the cryptographic key or pre-signed key rotation transaction request, respectively.

As used herein, the term "third-party actor" refers to an entity that interacts with the distributed digital ledger transaction network and is not associated with a particular user account. To illustrate, in the context of a first user account of the distributed digital ledger transaction network that has initiated a transaction to delegate a permission to rotate the cryptographic keys of the first user account to a second user account, a third-party actor refers to an entity that is associated with neither the first user account nor the second user account. As an example, a third-party actor can include another user account of the distributed digital ledger transaction network or a computing device interacting directly with the distributed digital ledger transaction network.

As used herein, the term "consensus" refers to a confirmation of a distributed digital ledger (e.g., confirmation of a distributed digital ledger reflecting a particular state and/or transactions). In particular, consensus can refer to acceptance of a distributed digital ledger via a consensus protocol. In some embodiments, consensus refers to acceptance of the execution results corresponding to a transaction and the state of the distributed digital ledger in light of those execution results). Consensus can be determined using a variety of different consensus protocols, including various members of the Byzantine fault tolerant family of consensus protocols. To illustrate, consensus can be determined using a HotStuff consensus protocol, a proof-of-work consensus protocol, a proof-of-stake consensus protocol, and/or a delegated proof-of-stake consensus protocol. For example, consensus can be determined based on a number of votes provided by a set of validator nodes of the distributed digital ledger transaction network confirming that a set of transactions (or the execution results corresponding to the transactions) is valid.

Additional detail regarding the pre-signed cryptographic rotation system will now be provided with reference to the figures. For example, FIG. 1 illustrates a schematic diagram of an exemplary system environment ("environment") 100 in which a pre-signed cryptographic rotation system 106 can be implemented. As illustrated in FIG. 1, the environment 100 includes a server(s) 102, a network 108, client devices 110a-110n, a distributed digital ledger transaction network 114, and a digital data storage device 116.

Although the environment 100 of FIG. 1 is depicted as having a particular number of components, the environment 100 can have any number of additional or alternative components (e.g., any number of servers, client devices, distributed digital ledger transaction networks, or digital data storage devices in communication with the pre-signed cryptographic rotation system 106 either directly or via the network 108). Similarly, although FIG. 1 illustrates a particular arrangement of the server(s) 102, the network 108, the client devices 110a-110n, the distributed digital ledger transaction network 114, and the digital data storage device 116, various additional arrangements are possible.

The server(s) 102, the network, 108, the client devices 110a-110n, the distributed digital ledger transaction network 114, and the digital data storage device 116 may be communicatively coupled with each other either directly or indirectly (e.g., through the network 108 discussed in greater detail below in relation to FIG. 8). Moreover, the server(s) 102, the client devices 110a-110n, and the distributed digital ledger transaction network may include a variety of computing devices (including one or more computing devices as discussed in greater detail with relation to FIG. 8).

As mentioned above, the environment 100 includes the server(s) 102. In one or more embodiments, the server(s) 102 generate, store, receive, and/or transmit digital data, including digital data related to transaction requests to be implemented via the distributed digital ledger transaction network 114. To provide an illustration, the server(s) can generate (or receive) a transaction request and initiate the corresponding transaction by submitting the transaction request—signed (e.g., encrypted) using the cryptographic key of a user account—to the distributed digital ledger transaction network 114. In one or more embodiments, the server(s) 102 comprises a data server. In some embodiments, the server(s) 102 comprises a communication server or a web-hosting server.

As shown in FIG. 1, the server(s) 102 includes the cryptographic key management system 104. In one or more embodiments, the cryptographic key management system 104 manages and/or maintains the cryptographic keys of one or more user accounts of the distributed digital ledger transaction network 114. For example, the cryptographic key management system 104 can store the cryptographic keys of a user account and access the cryptographic keys to perform various tasks, such as to sign a transaction request for submission to the distributed digital ledger transaction network 114. In some implementations, the cryptographic key management system 104 stores the cryptographic keys of a user account locally (e.g., within the server(s) 102). In some cases, the cryptographic key management system 104 stores the cryptographic keys of a user account in external storage (e.g., the digital data storage device 116, the client devices 110a-110n, and/or one or more computing devices of the distributed digital ledger transaction network 114).

Additionally, the server(s) 102 include the pre-signed cryptographic rotation system 106. In particular, in one or more embodiments, the pre-signed cryptographic rotation system 106 utilizes the server(s) 102 to initiate key rotation transactions using pre-signed key rotation transaction requests. For example, the pre-signed cryptographic rotation system 106 can utilize the server(s) 102 to generate a pre-signed key rotation transaction request for a user account and initiate a key rotation transaction using the pre-signed key rotation transaction request.

To illustrate, in one or more embodiments, the pre-signed cryptographic rotation system 106 utilizes the server(s) 102 to initiate a transaction, via the distributed digital ledger transaction network 114, delegating a permission to rotate the cryptographic keys of a first user account to a second user account. The pre-signed cryptographic rotation system 106 further, via the server(s) 102, utilizes a cryptographic key of the second user account to generate a pre-signed key rotation transaction request for the first user account based on the delegation. Via the server(s) 102, the pre-signed cryptographic rotation system 106 can store the pre-signed key rotation transaction request in a first digital data storage location that is different than a second digital data storage location storing the cryptographic key of the second user account. Further, the pre-signed cryptographic rotation system 106, via the server(s) 102, initiates a key rotation transaction via the distributed digital ledger transaction network 114 by accessing the pre-signed key rotation transaction request from the second digital data storage location.

In one or more embodiments, the distributed digital ledger transaction network 114 includes a plurality of computing devices that maintain a distributed digital ledger. For example, the distributed digital ledger transaction network 114 can receive (e.g., via one of its computing devices) a transaction request, such as a transaction request to rotate the cryptographic keys of a user account or to transfer digital assets between user accounts. In response to receiving the transaction request, the distributed digital ledger transaction network 114 can operate to execute and commit the corresponding transaction to the distributed digital ledger using a consensus protocol. Further, in maintaining the distributed digital ledger, the distributed digital ledger transaction network 114 can maintain one or more authenticated data structures (e.g., in the form of Merkle Trees) that store user account data (e.g., user account balances) and/or transaction information.

In one or more embodiments, the digital data storage device 116 stores digital data utilized by the pre-signed cryptographic rotation system 106 and/or the distributed digital ledger transaction network 114. For example, in some implementations, the digital data storage device 116 stores cryptographic keys of user accounts, such as the cryptographic key of a user account that has been delegated a permission to rotate the cryptographic keys of another user account. Indeed, in some embodiments, the digital data storage device 116 includes a storage device that is offline and communicates with the pre-signed cryptographic rotation system 106 directly to offer security against network access. For example, in some implementations, the digital data storage device 116 includes a cold storage device providing one or more cold storage locations for increased security when storing sensitive digital data. It should be noted, however, that though FIG. 1 illustrates the digital data storage device 116 as a distinct component, one or more embodiments include the digital data storage device 116 as a component of the server(s) 102, the cryptographic key management system 104, or the pre-signed cryptographic rotation system 106.

In one or more embodiments, the client devices 110a-110n include computing devices that are capable of interacting with the pre-signed cryptographic rotation system 106, such as by submitting transaction requests or instructions to generate transaction requests. For example, in some implementations, the client devices 110a-110n include at least one of a smartphone, a tablet, a desktop computer, a laptop computer, a head-mounted-display device, or other electronic device. Further, in some cases, each of the client devices 110a-110n is associated with one or more user accounts of the distributed digital ledger transaction network 114. In some instances, the client devices 110a-110n include one or more applications (e.g., the client application 112) that are capable of interacting with the pre-signed cryptographic rotation system 106, such as by submitting transaction requests or instructions to generate transaction requests. For example, in some embodiments, the client application 112 includes a software application installed on the client devices 110a-110n. In other cases, however, the client application 112 includes a web browser or other application that accesses a software application hosted on the server(s) 102.

The pre-signed cryptographic rotation system 106 can be implemented in whole, or in part, by the individual elements of the environment 100. Indeed, although FIG. 1 illustrates the pre-signed cryptographic rotation system 106 implemented with regard to the server(s) 102, different components of the pre-signed cryptographic rotation system 106 can be implemented by a variety of devices within the environment 100. For example, one or more (or all) components of the pre-signed cryptographic rotation system 106 can be implemented by a different computing device (e.g., one of the client devices 110a-110n) or a separate server from the server(s) 102 hosting the cryptographic key management system 104. Example components of the pre-signed cryptographic rotation system 106 will be described below with regard to FIG. 6.

Figure 2:
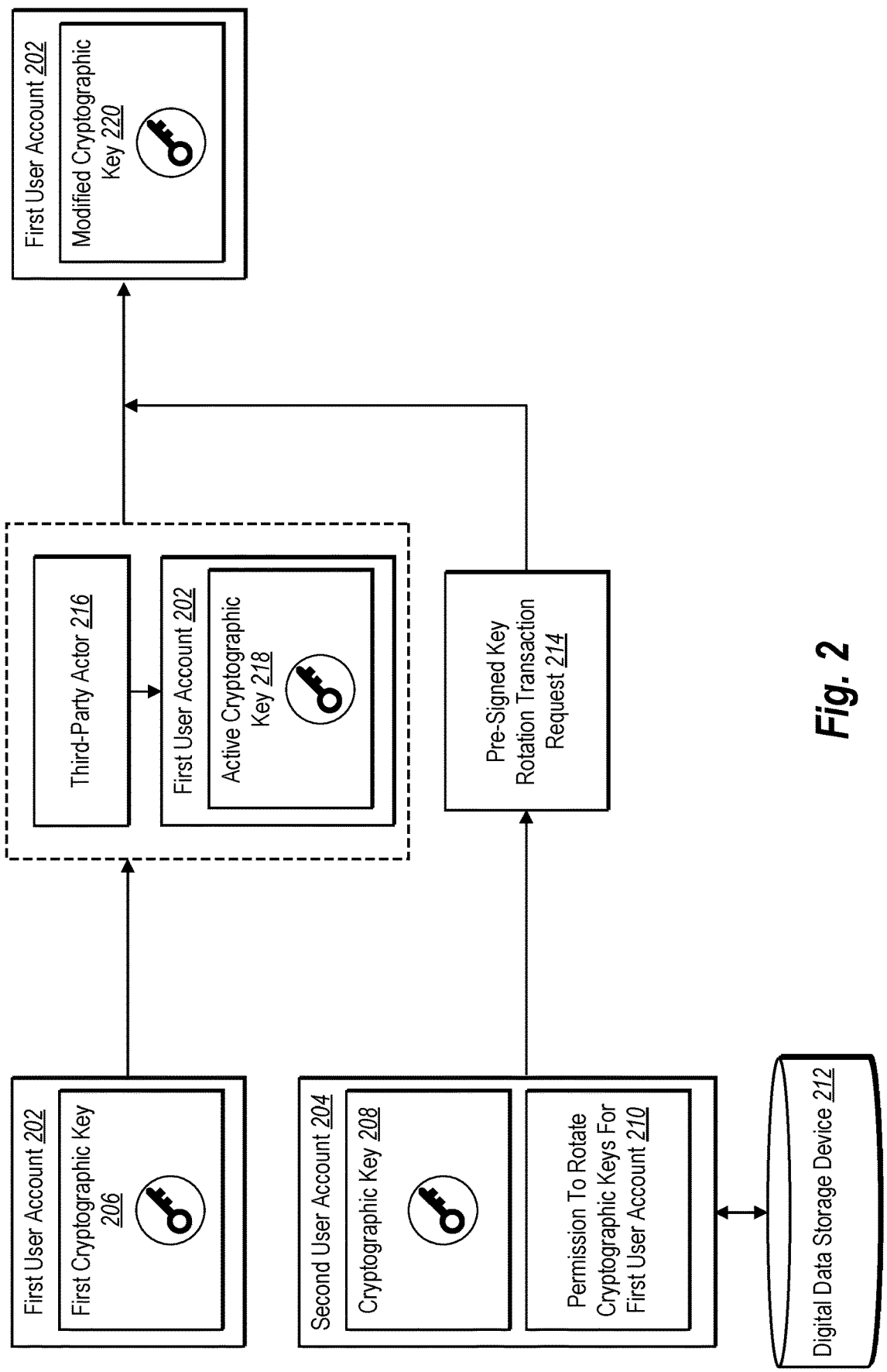
FIG. 2 illustrates a diagram of the pre-signed cryptographic rotation system utilizing a pre-signed key rotation transaction request to initiate a key rotation transaction for a user account of a distributed digital ledger transaction network in accordance with one or more embodiments.

As mentioned above, the pre-signed cryptographic rotation system 106 can utilize a pre-signed key rotation transaction request to initiate a key rotation transaction that rotates a cryptographic key of a user account of a distributed digital ledger transaction network. FIG. 2 illustrates an overview diagram of the pre-signed cryptographic rotation system 106 initiating a key rotation transaction utilizing a pre-signed key rotation transaction request in accordance with one or more embodiments.

As shown in FIG. 2, the pre-signed cryptographic rotation system 106 interacts with a first user account 202 of a distributed digital ledger transaction network and a second user account 204 of the distributed digital ledger transaction network. In one or more embodiments, the second user account 204 is associated with the first user account 202. For example, the second user account 204 can be associated with the same user profile or client device as the first user account 202. In some instances, however, the second user account 204 is unassociated with the first user account 202 (e.g., is associated with a different user profile or client device as the first user account 202).

As further shown in FIG. 2, the first user account 202 includes a first cryptographic key 206. In one or more embodiments, first cryptographic key 206 corresponds to an active cryptographic key for the first user account 202. In other words, the pre-signed cryptographic rotation system 106 can utilize the first cryptographic key 206 of the first user account 202 to sign transaction requests for the first user account 202 or can reference the first cryptographic key 206 in transaction requests for authentication by the distributed digital ledger transaction network.

Similarly, as shown in FIG. 2, the second user account 204 includes a cryptographic key 208. In one or more embodiments, the cryptographic key 208 of the second user account 204 corresponds to an active cryptographic key for the second user account. Further, the second user account 204 includes a permission 210 to rotate one or more cryptographic keys of the first user account 202. In particular, in one or more embodiments, the pre-signed cryptographic rotation system 106 delegated the permission 210 to the second user account 204. Delegating permissions to rotate cryptographic keys of user accounts will be discussed in more detail with regard to FIGS. 3A-3B. In one or more embodiments, the permission 210 to rotate the cryptographic keys of the first user account 202 enables the second user account 204 to initiate a key rotation transaction, via the distributed digital ledger transaction network, that will rotate one or more cryptographic keys of the first user account.

As further shown in FIG. 2, the second user account 204 is associated with a digital data storage device 212. For example, in one or more embodiments, digital data associated with the second user account 204 (e.g., the cryptographic key 208 and/or the permission 210 to rotate the cryptographic keys of the first user account 202) are stored in the digital data storage device 212. In some implementations, the pre-signed cryptographic rotation system 106 stores the digital data associated with the second user account 204 in the digital data storage device 212. In some implementations, the digital data is stored in the digital data storage device 212 by some external system, such as the distributed digital ledger transaction network. In some cases, the digital data storage device 212 includes a cold storage device (e.g., an offline storage device, such as an offline crypto wallet) providing cold storage.

As illustrated in FIG. 2, the pre-signed cryptographic rotation system 106 utilizes the second user account 204 to generate a pre-signed key rotation transaction request 214. In particular, the pre-signed cryptographic rotation system 106 utilizes the cryptographic key of the second user account 204 to generate the pre-signed key rotation transaction request 214. The pre-signed key rotation transaction request 214 can correspond to a transaction for rotating the cryptographic keys of the first user account 202 based on the permission 210 delegated to the second user account 204. In some embodiments, the pre-signed key rotation transaction request 214 corresponds to a transaction for generating a modified cryptographic key that is provided to the first user account 202. As will be described in more detail below, the pre-signed cryptographic rotation system 106 can store the pre-signed key rotation transaction request 214 for later use in rotating the cryptographic keys of the first user account 202.

Additionally, as shown in FIG. 2, the pre-signed cryptographic rotation system 106 can determine that a third-party actor 216 accessed the first cryptographic key 206 of the first user account 202. For example, as shown, the pre-signed cryptographic rotation system 106 can determine that the third-party actor 216 has initiated an exchange of the first cryptographic key 206 of the first user account 202 to an active cryptographic key 218. In other words, the pre-signed cryptographic rotation system 106 can determine that the third-party actor 216 replaced the first cryptographic key 206 of the first user account with a new cryptographic key—the new cryptographic key becoming the active cryptographic key for the first user account 202. In one or more instances, the active cryptographic key 218 is unknown to the pre-signed cryptographic rotation system 106, preventing the pre-signed cryptographic rotation system 106 from generating and/or submitting transaction requests for the first user account 202.

In some implementations, the pre-signed cryptographic rotation system 106 determines that the third-party actor 216 initiated the exchange by receiving a notification that the first cryptographic key 206 has been replaced. In some instances, the pre-signed cryptographic rotation system 106 receives a notification of a transaction request that was submitted using the active cryptographic key 218. In some cases, the pre-signed cryptographic rotation system 106 determines that a transaction request submitted with the first cryptographic key 206 was rejected by the distributed digital ledger transaction network.

As further shown in FIG. 2, the pre-signed cryptographic rotation system 106 utilizes the pre-signed key rotation transaction request 214 to exchange the active cryptographic key 218 for the modified cryptographic key 220. In particular, the pre-signed cryptographic rotation system 106 utilizes the pre-signed key rotation transaction request 214 to initiate a key rotation transaction, via the distributed digital ledger transaction network, that exchanges the active cryptographic key 218 for the modified cryptographic key 220. As shown, the pre-signed cryptographic rotation system 106 can utilize the pre-signed key rotation transaction request 214 in response to determining that the third-party actor 216 exchanged the first cryptographic key 206 of the first user account 202 with the active cryptographic key 218.

As indicated by FIG. 2, the modified cryptographic key 220 becomes the active cryptographic key for the first user account 202. Thus, the pre-signed cryptographic rotation system 106 can utilize the pre-signed key rotation transaction request 214 to exchange a cryptographic key that is active for the first user account 202 at the time the key rotation transaction is initiated (i.e., the active cryptographic key 218) for a new cryptographic key that becomes the active cryptographic key for the first user account 202. In one or more embodiments, the modified cryptographic key 220 becomes the active cryptographic key for the first user account 202 based on a consensus of the key rotation transaction via the distributed digital ledger transaction network.

Accordingly, in one or more embodiments, the pre-signed cryptographic rotation system 106 can initiate transactions for the first user account 202 using the modified cryptographic key 220. Indeed, the pre-signed cryptographic rotation system 106 can utilize the modified cryptographic key 220 to sign transaction requests and/or can reference the cryptographic key in transaction requests for authentication by the distributed digital ledger transaction network.

As discussed above, the pre-signed cryptographic rotation system 106 can utilize a pre-signed key rotation transaction request generated using one user account to initiate a key rotation transaction for rotating the cryptographic keys of another user account. FIGS. 3A-3D illustrate diagrams for generating and utilizing a pre-signed key rotation transaction request to rotate the cryptographic keys of a user account in accordance with one or more embodiments.

Figure 3A:
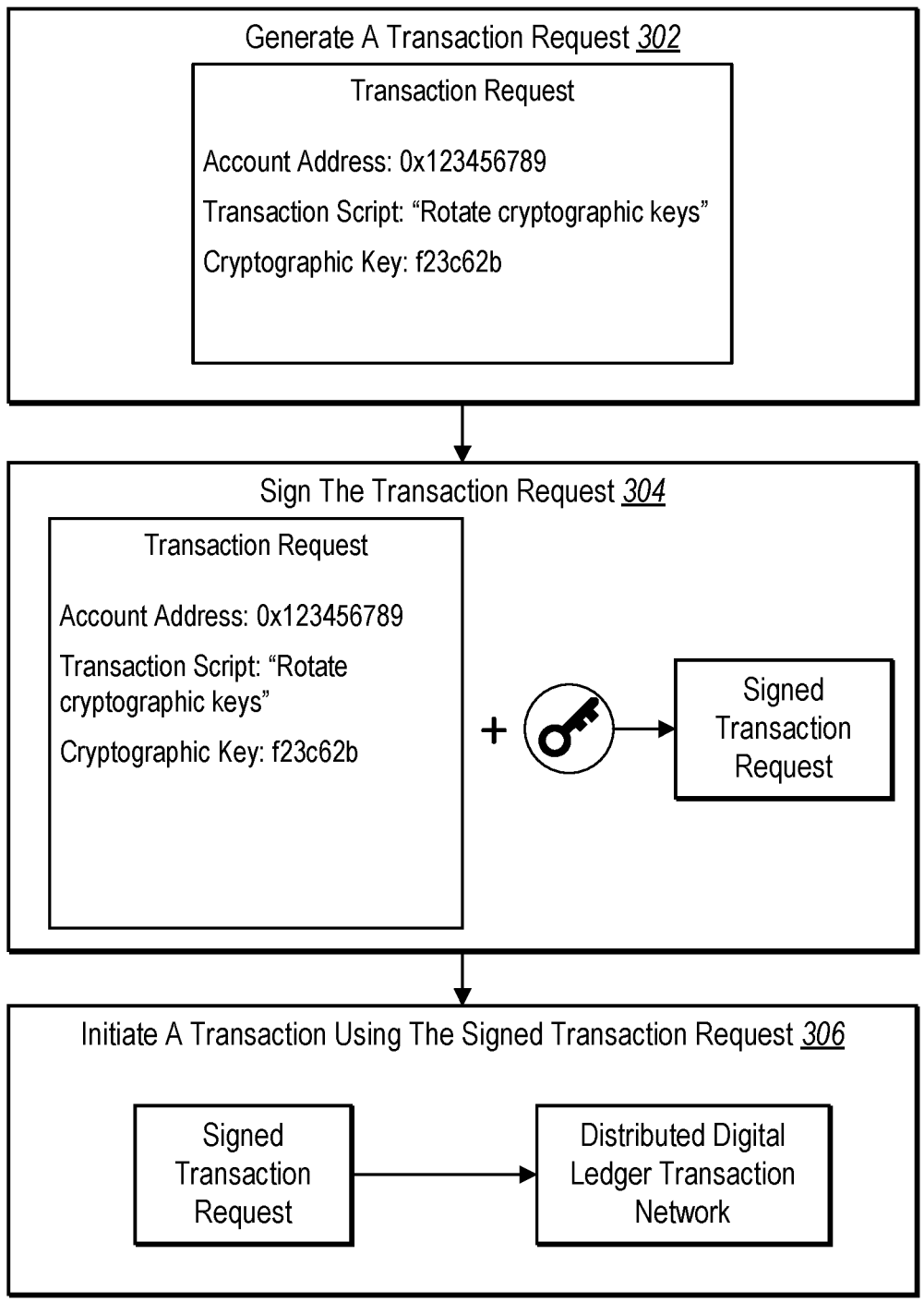
FIG. 3A illustrates a block diagram for initiating a transaction via a distributed digital ledger transaction network using a signed transaction request in accordance with one or more embodiments.

In particular, FIG. 3A illustrates a block diagram for initiating a transaction via a distributed digital ledger transaction network using a signed transaction request in accordance with one or more embodiments. As seen in FIG. 3A, the pre-signed cryptographic rotation system 106 performs an act 302 of generating a transaction request. In some embodiments, the pre-signed cryptographic rotation system 106 generates the transaction request based on instructions provided by a client device associated with the user account submitting the transaction request. In some implementations, rather than generating the transaction request, the pre-signed cryptographic rotation system 106 receives the transaction request (e.g., from the client device associated with the user account submitting the transaction request).

The transaction request can include several pieces of information. For example, the transaction request can include the account address corresponding to the user account submitting the transaction request, the transaction script used to execute the requested transaction, a cryptographic key (e.g., an authentication key) associated with the user account submitting the transaction request, etc. In one or more embodiments, the transaction request includes additional information as well.

As further shown in FIG. 3A, the pre-signed cryptographic rotation system 106 also performs an act 304 of signing the transaction request. In particular, the pre-signed cryptographic rotation system 106 can utilize a cryptographic key (e.g., a private key) of the user account submitting the transaction request to sign the transaction request. In one or more embodiments, the pre-signed cryptographic rotation system 106 utilizes the cryptographic key to sign the transaction request by encrypting the transaction request using the cryptographic key.

Additionally, as shown in FIG. 3A, the pre-signed cryptographic rotation system 106 further performs the act 306 of initiating a transaction using the signed transaction request. For example, in one or more embodiments, the pre-signed cryptographic rotation system 106 sends the signed transaction request to the distributed digital ledger transaction network. Accordingly, the pre-signed cryptographic rotation system 106 initiates execution and commitment of the transaction corresponding to the transaction request via the distributed digital ledger transaction network.

Figure 3B:
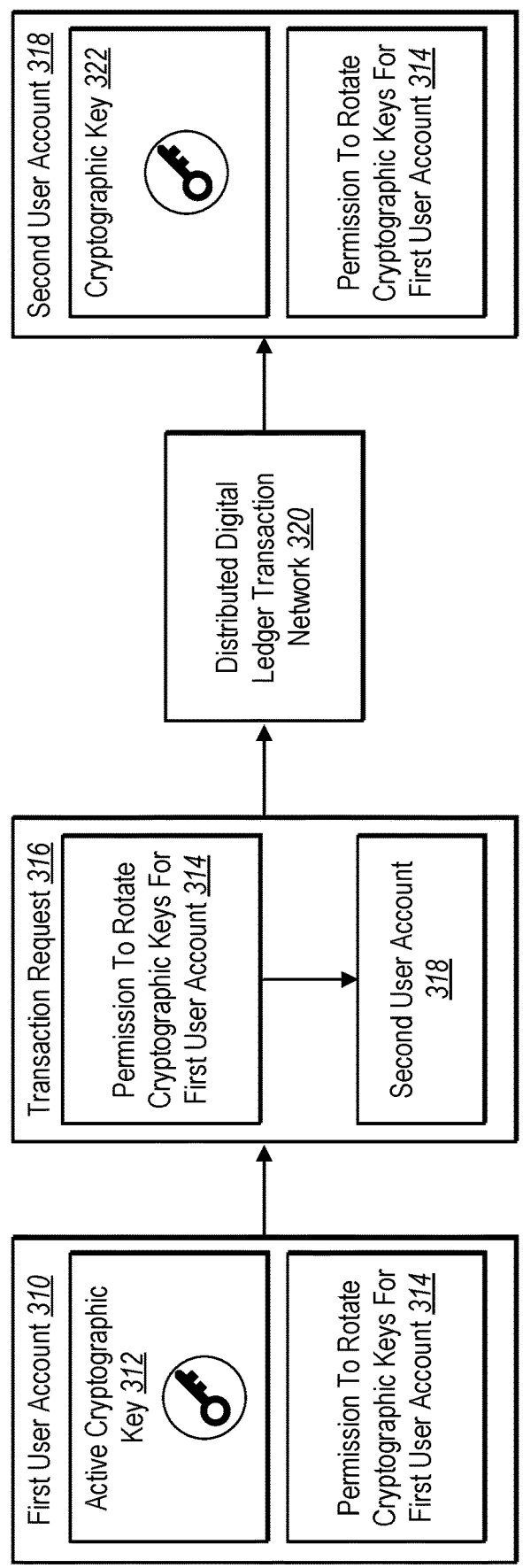
FIG. 3B illustrates a block diagram for delegating a permission to rotate one or more cryptographic keys of a first user account to a second user account in accordance with one or more embodiments.

FIG. 3B illustrates a block diagram for delegating a permission to rotate one or more cryptographic keys of a first user account to a second user account in accordance with one or more embodiments. In particular, as shown in FIG. 3B, a first user account 310 includes an active cryptographic key 312 and a permission 314 to rotate one or more cryptographic keys of the first user account 310.

As shown in FIG. 3B, the pre-signed cryptographic rotation system 106 generates a transaction request 316 that delegates the permission 314 to rotate one or more cryptographic keys of the first user account 310 to a second user account 318. As discussed above with reference to FIG. 3A, the pre-signed cryptographic rotation system 106 can utilize the active cryptographic key 312 of the first user account 310 to sign the transaction request 316. The pre-signed cryptographic rotation system 106 can utilize the transaction request 316 to initiate a transaction for delegating the permission 314 to the second user account 318 via the distributed digital ledger transaction network 320. For example, the pre-signed cryptographic rotation system 106 can submit the transaction request 316 to the distributed digital ledger transaction network 320 for execution and commitment to the distributed digital ledger via consensus.

Accordingly, through execution and commitment of the transaction corresponding to the transaction request 316 by the distributed digital ledger transaction network 320, the pre-signed cryptographic rotation system 106 delegates the permission 314 to the second user account 318. Thus, the pre-signed cryptographic rotation system 106 can subsequently utilize the second user account 318 (e.g., a cryptographic key 322 of the second user account 318) to initiate key rotation transactions for rotating one or more cryptographic keys of the first user account 310 via the distributed digital ledger transaction network 320.

Figure 3C:
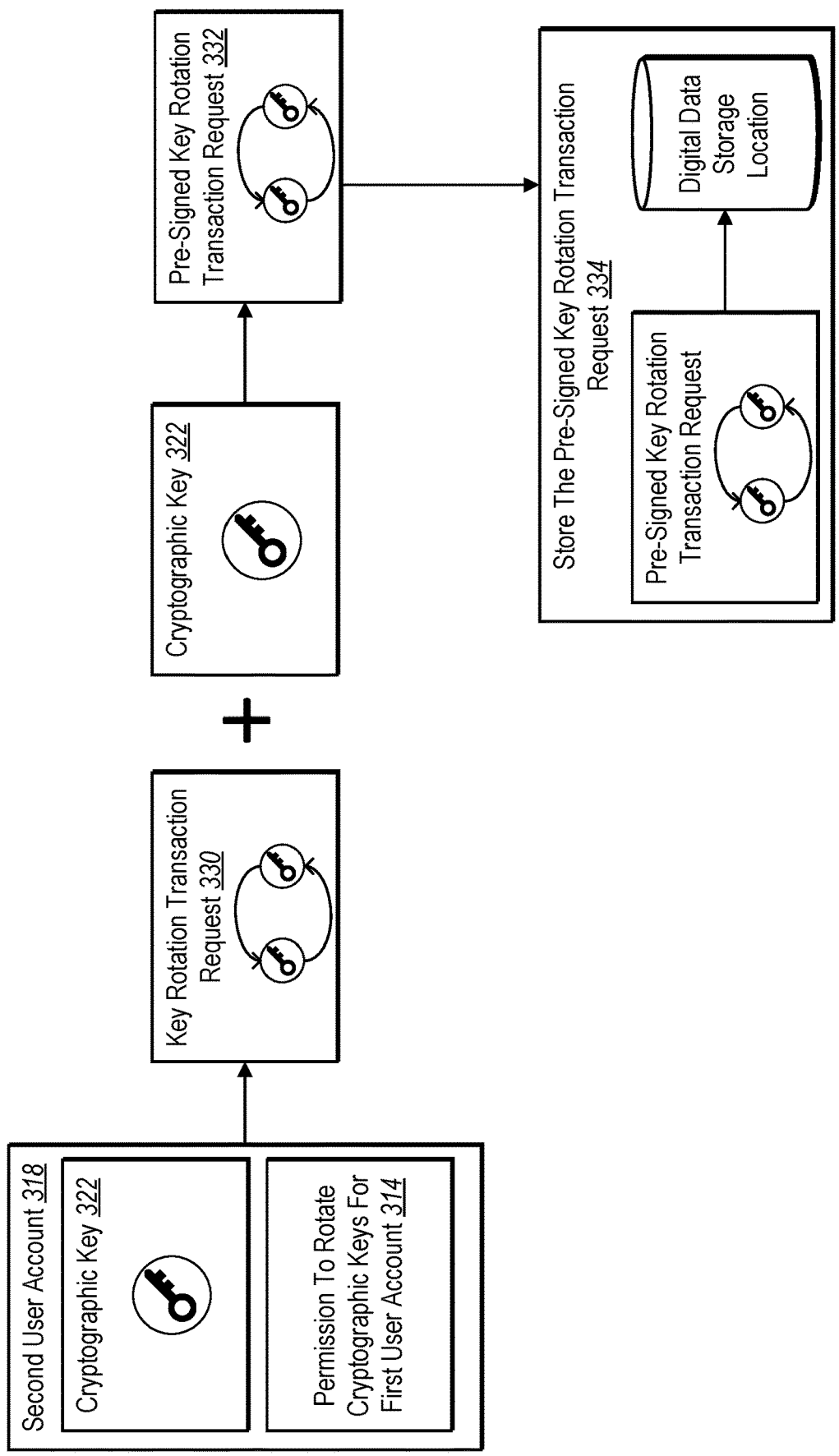
FIG. 3C illustrates a diagram for generating a pre-signed key rotation transaction request to rotate one or more cryptographic keys of a user account in accordance with one or more embodiments.

FIG. 3C illustrates a diagram for generating a pre-signed key rotation transaction request to rotate one or more cryptographic keys of the first user account 310 in accordance with one or more embodiments. In particular, the pre-signed cryptographic rotation system 106 generates the pre-signed key rotation transaction request based on the delegation of the permission 314 to the second user account 318.

As shown in FIG. 3C, the pre-signed cryptographic rotation system 106 generates a key rotation transaction request 330 to rotate one or more cryptographic keys for the first user account 310. In some implementations, the key rotation transaction request 330 corresponds to a transaction for generating a modified cryptographic key for the first user account 310, which would then be used to rotate at least one cryptographic key of the first user account 310 (e.g., provided to the first user account 310 in place of a currently active cryptographic key of the first user account 310). Using the cryptographic key 322 of the second user account 318, the pre-signed cryptographic rotation system 106 can sign the key rotation transaction request 330 to generate the pre-signed key rotation transaction request 324. In particular, based on the delegation of the permission 314 to the second user account 318, the pre-signed cryptographic rotation system 106 can utilize the cryptographic key 322 of the second user account 318 to sign the key rotation transaction request 330 and generate the pre-signed key rotation transaction request 332.

As shown in FIG. 3C, the pre-signed cryptographic rotation system 106 further performs an act 334 of storing the pre-signed key rotation transaction request 332. In particular, the pre-signed cryptographic rotation system 106 stores the pre-signed key rotation transaction request 332 in a digital data storage location. In one or more embodiments, the pre-signed cryptographic rotation system 106 stores the pre-signed key rotation transaction request 332 in a digital data storage location that is different than the digital data storage location storing the cryptographic key 322 of the second user account 318.

Indeed, in one or more embodiments, the pre-signed cryptographic rotation system 106 stores the cryptographic key 322 of the second user account 318 in a digital data storage location. In some implementations, however, the cryptographic key 322 of the second user account 318 is stored in the digital data storage location by another system (e.g., the distributed digital ledger transaction network 320). In some implementations, the digital data storage location storing the cryptographic key 322 of the second user account 318 is a cold storage location. Accordingly, the digital data storage location storing the cryptographic key 322 of the second user account 318 can be associated with a relatively high data retrieval time. As such, accessing the cryptographic key 322 of the second user account 318 can require an undesirable amount of time that poses risks in many time-sensitive cases, such as when a third-party actor has accessed a cryptographic key of the first user account 310 (e.g., the active cryptographic key 312) and expediency is necessary to prevent (or stop) the loss of digital assets held by the first user account 310.

Accordingly, the pre-signed cryptographic rotation system 106 can store the pre-signed key rotation transaction request 332 in a digital data storage location that is associated with a relatively lower data retrieval time compared to the digital storage location storing the cryptographic key 322 of the second user account 318. For example, in some instances, the pre-signed cryptographic rotation system 106 stores the pre-signed key rotation transaction request 332 locally (e.g., on the computing device implementing the pre-signed cryptographic rotation system 106) for easy access and quick retrieval. In some cases, the pre-signed cryptographic rotation system 106 stores the pre-signed key rotation transaction request 332 in some other form of warm or hot storage (e.g., in a cloud network, in a client device associated with the first user account 310, etc.).

Figure 3D:
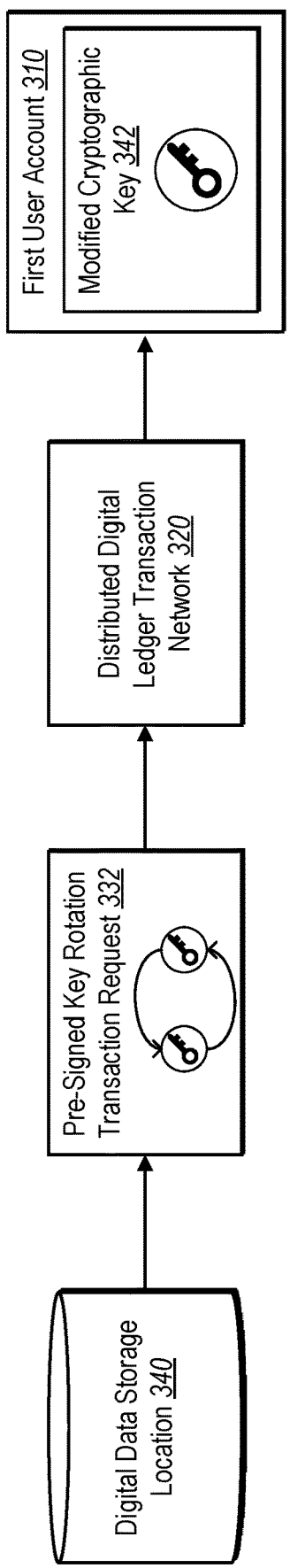
FIG. 3D illustrates a diagram for utilizing a pre-signed key rotation transaction request in accordance with one or more embodiments.

FIG. 3D illustrates a diagram for utilizing the pre-signed key rotation transaction request 332 in accordance with one or more embodiments. As shown in FIG. 3D, the pre-signed cryptographic rotation system 106 accesses the pre-signed key rotation transaction request 332 from the digital data storage location 340 storing the pre-signed key rotation transaction request 332. In one or more embodiments, the pre-signed cryptographic rotation system 106 accesses the pre-signed key rotation transaction request 332 upon determining that a third-party actor has accessed the active cryptographic key 312 of the first user account 310 (e.g., replaced the active cryptographic key 312 of the first user account 310 with a new active cryptographic key that is unknown to the pre-signed cryptographic rotation system 106).

In some instances, however, the pre-signed cryptographic rotation system 106 accesses the pre-signed key rotation transaction request 332 based on a predetermined time for rotating cryptographic keys of the first user account 310. Indeed, in some implementations, the pre-signed cryptographic rotation system 106 determines a time for rotating one or more cryptographic keys of the first user account 310. For example, in some implementations, the pre-signed cryptographic rotation system 106 determines a frequency with which one or more cryptographic keys of the first user account 310 are to be rotated. In some embodiments, the predetermined time for rotating cryptographic keys is a default value of the pre-signed cryptographic rotation system 106. In some implementations, the pre-signed cryptographic rotation system 106 receives instructions from a client device associated with the first user account 310 indicating the predetermined time for rotating cryptographic keys.

In one or more embodiments, the pre-signed cryptographic rotation system 106 can access the pre-signed key rotation transaction request 332 in response to a variety of triggering events. For example, the pre-signed cryptographic rotation system 106 can access the pre-signed key rotation transaction request 332 in response to detecting a request to rotate a cryptographic key via a client device (e.g., user interaction with a key rotation option of a user interface provided via the client device).

Further, as shown in FIG. 3D, the pre-signed cryptographic rotation system 106 submits the pre-signed key rotation transaction request 332 to the distributed digital ledger transaction network 320. Accordingly, the pre-signed cryptographic rotation system 106 initiates a key rotation transaction via the distributed digital ledger transaction network 320. In particular, the pre-signed cryptographic rotation system 106 initiates the key rotation transaction to exchange a currently active key of the first user account 310 (e.g., the active cryptographic key 312 or another cryptographic key put in place by a third-party actor) to a modified cryptographic key 342.

Thus, the pre-signed cryptographic rotation system 106 provides an efficient and flexible approach to improving security around the cryptographic keys of a user account. Indeed, by delegating a permission to rotate one or more cryptographic keys of one user account to another user account, the pre-signed cryptographic rotation system 106 improves security by providing a flexible response to third-party attacks. In particular, delegating such a permission to another user account enables the pre-signed cryptographic rotation system 106 to use that other user account to regain control of a user account after having been locked out due to a third-party attack, such as when a third-party replaces the currently active cryptographic key of the user account with a different cryptographic key that is unknown. In some instances, by rotating the cryptographic keys of a user account based on a predetermined time (e.g., regularly), the pre-signed cryptographic rotation system 106 can improve security by preventing third-party attacks (or at least making third-party attacks more difficult).

Further, by utilizing pre-signed key rotation transaction requests, the pre-signed cryptographic rotation system 106 provides more efficiency in initiating key rotation transactions via a distributed digital ledger transaction network. Indeed, by pre-signing a key rotation transaction request and storing the pre-signed key rotation transaction request in a digital data storage location associated with a low data retrieval time, the pre-signed cryptographic rotation system 106 can quickly access the pre-signed key rotation transaction request for submission to the distributed digital ledger transaction network (e.g., without having to access the cryptographic key of the second user account). Thus, the pre-signed cryptographic rotation system 106 provides improved security by implementing an efficient feature for prevent (or at least stopping) the loss of digital assets held by a user account.

The pre-signed cryptographic rotation system 106 can utilize the second user account to generate various additional or alternative pre-signed transaction requests for the first user account. For example, in one or more embodiments, the pre-signed cryptographic rotation system 106 can utilize the cryptographic key of the second user account to generate a pre-signed transaction request for freezing (e.g., de-activating) the first user account. In some cases, the pre-signed cryptographic rotation system 106 generates such a pre-signed transaction request based on a permission to freeze the first user account that has been delegated to the second user account.

To illustrate, in one or more embodiments, the pre-signed cryptographic rotation system 106 utilizes the cryptographic key of the second user account to generate a pre-signed transaction request for freezing the first user account. The pre-signed cryptographic rotation system 106 can initiate a corresponding transaction via the distributed digital ledger transaction network. For example, the pre-signed cryptographic rotation system 106 can initiate the corresponding transaction upon determining that a third-party actor unassociated with the first user account or the second user account has accessed a cryptographic key of the first user account. In some implementations, the transaction corresponding to the pre-signed transaction request prevents digital assets from being transferred from the first user account. The transaction can further prevent other actions related to the first user account (e.g., the delegating of other permissions related to the first user account to the third-party actor). When appropriate (e.g., after having rotated the cryptographic keys of the first user account to implement the modified cryptographic key), the pre-signed cryptographic rotation system 106 can initiate another transaction (e.g., using another pre-signed transaction request) to re-activate the first user account.

Further, though the preceding discussion has focused on delegation of the permission to rotate the cryptographic keys of one user account to another user account, the pre-signed cryptographic rotation system 106 can delegate permissions to rotate the cryptographic keys of multiple user accounts to the same user account in some instances. For example, in at least one embodiment, the pre-signed cryptographic rotation system 106 delegates permissions to rotate the cryptographic keys of a first user account and a second user account to a third user account of the distributed digital ledger transaction network.

Accordingly, in one or more embodiments, the pre-signed cryptographic rotation system 106 utilizes the cryptographic key of the third user account to generate multiple pre-signed key rotation transaction requests for the first and second user accounts using duplicated sequence numbers. To illustrate, where the sequence number for the next transaction request to be submitted to the distributed digital ledger transaction network is N, the pre-signed cryptographic rotation system 106 can utilize the third user account to generate two pre-signed transaction requests for the first user account and two pre-signed transaction requests for the second user account. The pre-signed cryptographic rotation system 106 can utilize the sequence number N for the first pre-signed transaction request for the first user account and also utilize the sequence number N for the first pre-signed transaction request for the second user account. The pre-signed cryptographic rotation system 106 can further utilize the sequence number N+1 for the other pre-signed transaction requests. Specifically, the pre-signed cryptographic rotation system 106 can utilize the number N+1 for the second pre-signed transaction request for the first user account and utilize the number N+1 for the second pre-signed transaction request for the second user account. Accordingly, a pre-signed key rotation transaction request with the appropriate sequence number will be available for submission to the distributed digital ledger transaction network regardless of whether the pre-signed cryptographic rotation system 106 submits a pre-signed key rotation transaction request for the first user account and then the second user account or vice versa. In other words, by generating the multiple key rotation transaction requests with the duplicating sequence numbers, the pre-signed cryptographic rotation system 106 ensures that the distributed digital ledger transaction network can receive a transaction request having the proper sequence number from the third user account without having to access the third user account again.

Figure 4A:
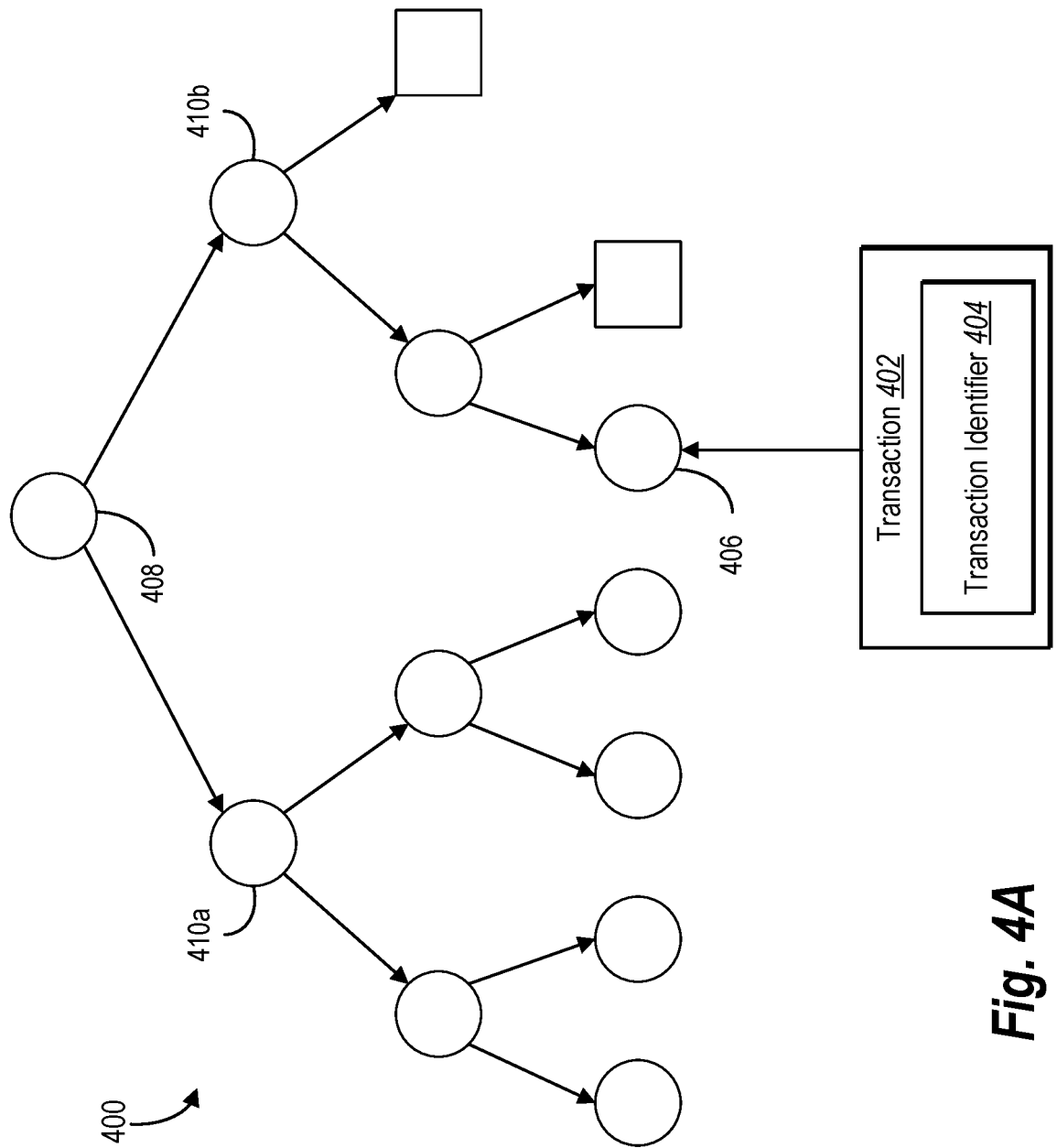
FIG. 4A illustrates an authenticated data structure utilized by the pre-signed cryptographic rotation system to prevent replay attacks in accordance with one or more embodiments.
Figure 4B:
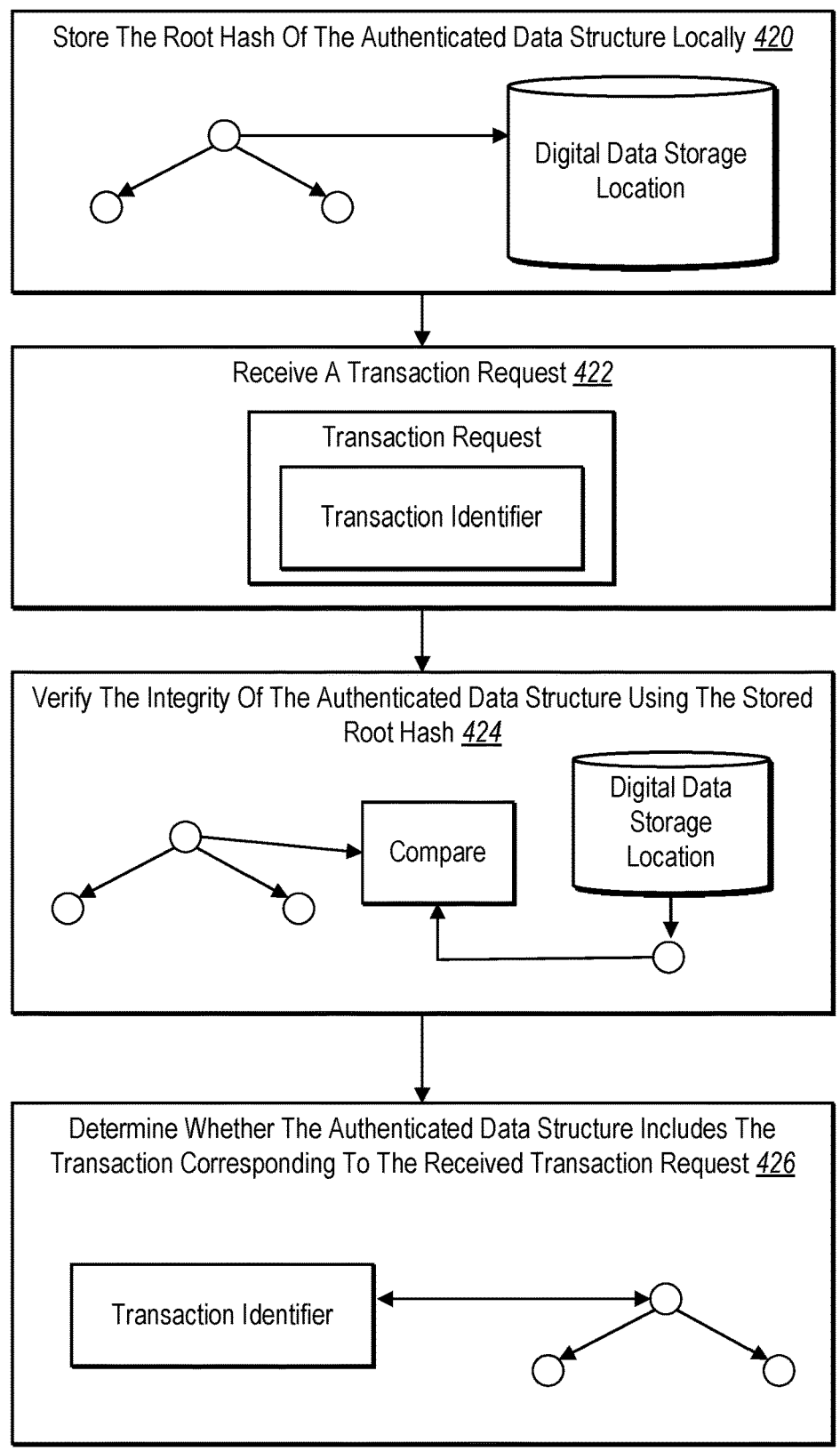
FIG. 4B illustrate a block diagram for utilizing the authenticated data structure of FIG. 4A for preventing replay attacks in accordance with one or more embodiments.

As mentioned above, the pre-signed cryptographic rotation system 106 can operate to prevent the replay of a previously-authorized transaction. In particular, the pre-signed cryptographic rotation system 106 can utilize digital data from an authenticated data structure associated with (e.g., maintained by) the distributed digital ledger transaction network to prevent the iterative submission of previously authorized (e.g., signed) transaction requests to the distributed digital ledger transaction network. FIGS. 4A-4B illustrate diagrams for using digital data from an authenticated data structure to prevent the replay of a previously-authorized transaction in accordance with one or more embodiments.

In particular, FIG. 4A illustrates an authenticated data structure 400 utilized by the pre-signed cryptographic rotation system 106 to prevent replay attacks in accordance with one or more embodiments. In particular, the authenticated data structure 400 corresponds to an authenticated data structure maintained (e.g., stored) by the distributed digital ledger transaction network. As used herein, the term "authenticated data structure" refers to a collection of data. In particular, an authenticated data structures can refer to a collection of data that allows a verifier (e.g., the pre-signed cryptographic rotation system) to measure accuracy of the data. An authenticated data structure can include one or more tree structures (e.g., a binary tree, such as a Merkle tree). In some implementations, the tree structure maps to entries of one or more corresponding databases. Accordingly, the verifier can analyze the tree structure to verify the accuracy of the tree structure and/or the corresponding database.

Indeed, as shown in FIG. 4A, the authenticated data structure 400 includes a Merkle tree. As further shown in FIG. 4A, the authenticated data structure 400 stores transaction information. In particular, the authenticated data structure 400 can store transaction information in each leaf node of the Merkle tree. In one or more embodiments, each leaf node corresponds to a different transaction. To illustrate, the authenticated data structure 400 stores information related to the transaction 402, such as the transaction identifier 404 associated with the transaction 402, within the leaf node 406. In one or more embodiments, the transaction identifier 404 includes an identifier (e.g., a combination of letters and/or numbers) that uniquely identifies the transaction 402 and/or the corresponding transaction request.

As further shown in FIG. 4A, the authenticated data structure 400 includes a root node 408. In particular, the root node 408 stores a root hash for the authenticated data structure 400. In one or more embodiments, the root hash includes a hash value generated by combining the values of the children node (e.g., the nodes 410a-410b) and applying a hash function to the combined value. Similarly, the values of each child node (and the child node of each child node, etc.) can include a hash value generated by combining the values of their respective child nodes and applying a hash function to the combined value. In some implementations, however, the value of each node in the authenticated data structure 400 includes a hash value generated by applying a hash function to the value of each child node and combining the resulting hash values.

Accordingly, in one or more embodiments, the root hash represents all of the data (e.g., all of the transaction information) stored within the authenticated data structure 400.

FIG. 4B illustrates a block diagram for utilizing the authenticated data structure 400 for preventing replay attacks in accordance with one or more embodiments. As shown in FIG. 4B, the pre-signed cryptographic rotation system 106 performs an act 420 of storing the root hash of the authenticated data structure 400 locally.

Indeed, as mentioned above, in one or more embodiments, the authenticated data structure 400 is maintained by the distributed digital ledger transaction network. In other words, the authenticated data structure 400 is stored and maintained external to the pre-signed cryptographic rotation system 106 (e.g., external to the computing device implementing the pre-signed cryptographic rotation system). Further, in some implementations, the pre-signed cryptographic rotation system 106 determines that digital data stored externally is inherently untrustworthy (e.g., before use, the digital data must be verified to be accurate, valid, and up-to-date). Accordingly, in some cases, the pre-signed cryptographic rotation system 106 determines that authenticated data structure is untrustworthy.

As such, in some cases, the pre-signed cryptographic rotation system 106 stores the root hash locally (e.g., within the computing device implementing the pre-signed cryptographic rotation system 106) in order to verify that the authenticated data structure 400 is accurate, valid, and up-to-date as discussed below. In particular, the pre-signed cryptographic rotation system 106 can store the root hash locally so that the stored root hash exists within the bounds of trust associated with the pre-signed cryptographic rotation system 106. In other words, the pre-signed cryptographic rotation system 106 can determine that the stored root hash is safe from being tampered with (e.g., modified) by malicious actors. Further, by storing the root hash of the authenticated data structure 400, the pre-signed cryptographic rotation system 106 can perform verification checks without having to store the entirety of the authenticated data structure 400. Thus, even computing devices with small amounts of memory can implement the pre-signed cryptographic rotation system and prevent replay attacks.

In one or more embodiments, the pre-signed cryptographic rotation system 106 updates the stored root hash after every transaction processed (e.g., executed and committed) by the distributed digital ledger transaction network. In particular, with every transaction process by the distributed digital ledger transaction network, the root hash of the authenticated data structure 400 can change. Accordingly, the pre-signed cryptographic rotation system 106 can store the new root hash. In some implementations, however, the pre-signed cryptographic rotation system 106 updates the stored root hash after every set of transactions have been processed.

Further, as shown in FIG. 4B, the pre-signed cryptographic rotation system 106 performs an act 422 of receiving a transaction request. Indeed, as suggested above, in some implementations, rather than generating a transaction request, the pre-signed cryptographic rotation system 106 can receive transaction requests. For example, in some instances, the pre-signed cryptographic rotation system 106 can receive a transaction request from a client device associated with the user account for which the transaction request is to be submitted. In one or more embodiments, the transaction request includes a transaction identifier.

In some instances, the pre-signed cryptographic rotation system 106 receives a transaction request from a third-party actor that is unassociated with the user account (e.g., a malicious actor). For example, the pre-signed cryptographic rotation system 106 can receive a transaction request from a third-party actor operating to replay a transaction that was previously authorized by the user account and processed by the distributed digital ledger transaction network (e.g., to receive the digital assets transferred via that transaction).

Indeed, in some cases, a third-party actor operates to replay a previously-authorized transaction account numerous times (e.g., indefinitely).

Accordingly, as shown in FIG. 4B, the pre-signed cryptographic rotation system 106 can perform an act 424 of verifying the integrity of the authenticated data structure 400 using the stored root hash. In particular, the pre-signed cryptographic rotation system 106 can compare the stored root hash with the root hash of the authenticated data structure 400. Upon determining that the stored root hash equals the root hash of the authenticated data structure 400, the pre-signed cryptographic rotation system 106 can determine that the authenticated data structure 400 is accurate, secure, and up-to-date (e.g., the authenticated data structure 400 has not been modified by a malicious actor). Accordingly, the pre-signed cryptographic rotation system 106 can utilize the data associated with the authenticated data structure 400 even though the authenticated data structure exists outside of the trust boundary associated with the pre-signed cryptographic rotation system 106.

As further shown by FIG. 4B, the pre-signed cryptographic rotation system 106 can perform an act 426 of determining whether the authenticated data structure 400 includes the transaction corresponding to the received transaction request. In particular, the pre-signed cryptographic rotation system 106 can search through the authenticated data structure 400 to determine whether the transaction information stored in the authenticated data structure 400 includes the transaction identifier of the received transaction request. If the authenticated data structure 400 includes the transaction identifier of the received transaction request, the pre-signed cryptographic rotation system 106 can determine that a transaction corresponding to the received transaction request was previously authorized and processed. Accordingly, the pre-signed cryptographic rotation system 106 can reject the received transaction request (e.g., the pre-signed cryptographic rotation system 106 won't sign the or submit the received transaction request for processing by the distributed digital ledger transaction network). If the authenticated data structure 400 does not include the transaction request, the pre-signed cryptographic rotation system 106 can sign and submit the transaction request for processing.

Thus, the pre-signed cryptographic rotation system 106 can implement additional security measures for preventing the replay of previously-authorized transactions. Accordingly, the pre-signed cryptographic rotation system 106 can prevent the loss of digital assets that would occur by allowing such a replay.

Figure 5A:
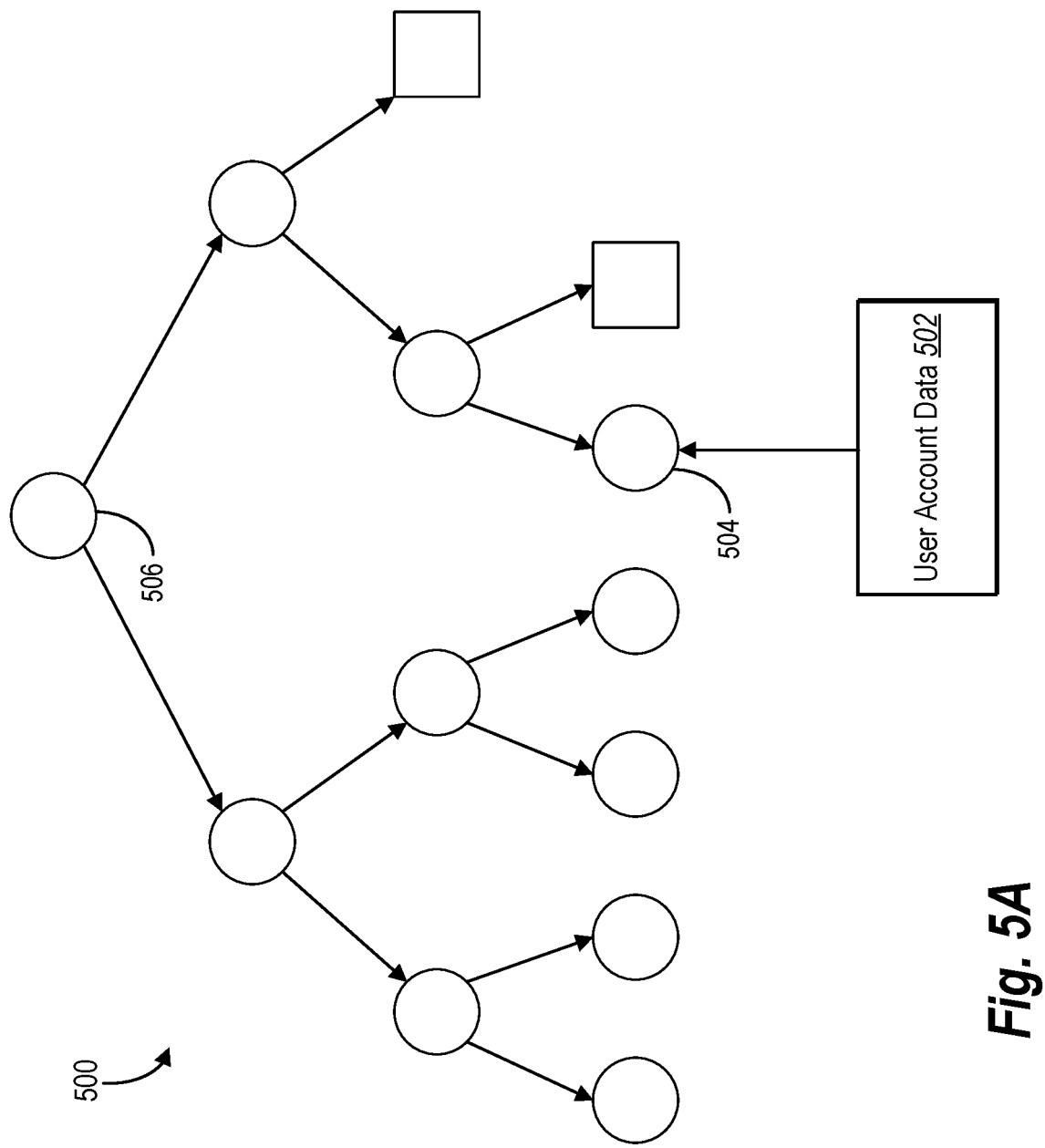
FIG. 5A illustrates an authenticated data structure utilized for verifying the freshness of user account data in accordance with one or more embodiments.
Figure 5B:
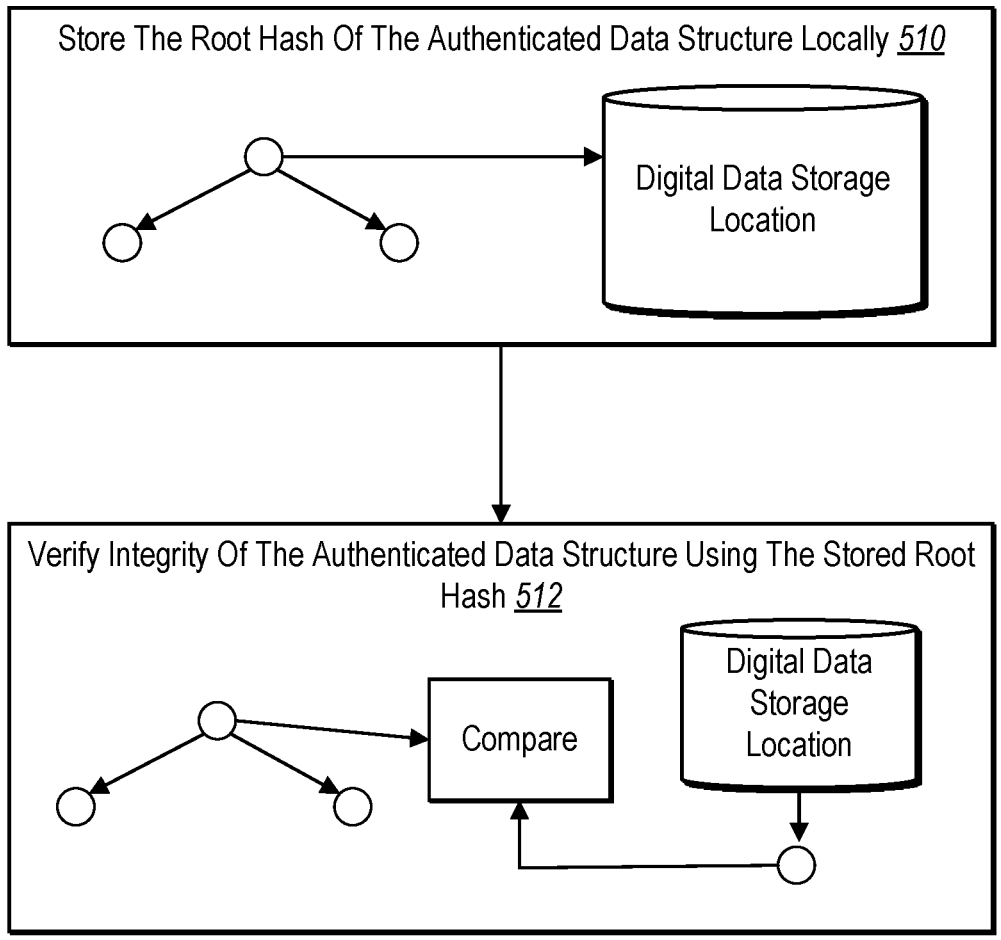
FIG. 5B illustrates a block diagram for utilizing the authenticated data structure of FIG. 5A for verifying the freshness of user account data in accordance with one or more embodiments.

As mentioned above, the pre-signed cryptographic rotation system 106 can also operate to verify the freshness of an authenticated data structure (e.g., verify that the authenticated data structure is up-to-date), particularly with regard to the user account data (e.g., user account balances) represented therein. FIGS. 5A-5B illustrate diagrams for verifying the freshness of an authenticated data structure in accordance with one or more embodiments.

In particular, FIG. 5A illustrates an authenticated data structure 500 utilized for verifying the freshness of user account data in accordance with one or more embodiments. In particular, the authenticated data structure 500 corresponds to an authenticated data structure maintained (e.g., stored) by the distributed digital ledger transaction network. As shown in FIG. 5A, the authenticated data structure 500 includes a Merkle tree.

As further shown in FIG. 5A, the authenticated data structure 500 stores user account information. For example, the authenticated data structure 500 can store the user account balances of the user accounts of the distributed digital ledger transaction network. In one or more embodiments, each leaf node of the authenticated data structure 500 represents the user account information for a different user account. To illustrate, the authenticated data structure 500 stores user account data 502 for a particular user account within the leaf node 504.

As further shown in FIG. 5A, the authenticated data structure 500 includes a root node 506. In particular, the root node 506 stores a root hash for the authenticated data structure 500. As with the authenticated data structure 400 of FIG. 4A, the root hash includes a hash value that represents all of the data (e.g., all of the user account data) stored within the authenticated data structure 500. In one or more embodiments, the pre-signed cryptographic rotation system 106 utilizes an authenticated data structure of a distributed digital ledger transaction network as described in SCALABLE, SECURE, EFFICIENT, AND ADAPTABLE DISTRIBUTED DIGITAL LEDGER TRANSACTION NETWORK, application Ser. No. 16/442,470, filed Jun. 15, 2019, which is hereby incorporated by reference herein in its entirety.

FIG. 5B illustrates a block diagram for utilizing the authenticated data structure 500 for verifying the freshness of user account data in accordance with one or more embodiments. As shown in FIG. 5B, the pre-signed cryptographic rotation system 106 performs an act 510 of storing the root hash of the authenticated data structure 500 locally. Indeed, as discussed above with reference to FIG. 5B, the pre-signed cryptographic rotation system 106 can store the root hash locally to utilize the data associated with the authenticated data structure 500 even though the authenticated data structure 500 is external to the pre-signed cryptographic rotation system 106. Further, as discussed above, the pre-signed cryptographic rotation system 106 can update the stored root hash after every transaction (or set of transactions) processed by the distributed digital ledger transaction network.

Further, as shown in FIG. 5B, the pre-signed cryptographic rotation system 106 can perform an act 512 of verifying the freshness of the authenticated data structure using the stored root hash. In particular, the pre-signed cryptographic rotation system 106 can determine whether the stored root node equals the root node of the authenticated data structure 500. If the stored root node equals the root node of the authenticated data structure 500, the pre-signed cryptographic rotation system 106 can determine that the authenticated data structure is accurate, storing the most up-to-date user account data (e.g., the most up-to-date user account balances).

In one or more embodiments, the pre-signed cryptographic rotation system 106 uses the stored root hash to verify the freshness of the authenticated data structure in response to receiving or generating a transaction request. By doing so, the pre-signed cryptographic rotation system 106 can determine that the transaction request is based on the most up-to-date user account data associated with the user accounts involved in the transaction request.

Indeed, in some implementations, the authenticated data structure 500 may be attacked by third-party actors who wish to initiate fraudulent transactions. In some implementations, the authenticated data structure 500 includes signatures with implemented transactions to verify that the transactions were, in fact, authorized. However, malicious third-party actors can attempt to falsify the data represented in the authenticated data structure 500 using a snapshot of a previous version of the authenticated data structure 500.

Accordingly, the falsified authenticated data structure may still include the signatures to show the transactions were authorized but will reflect the old user account data of the previous version of the authenticated data structure 500. In so doing, these third-part actors can attempt to initiate transactions based on the old user account data. For example, a third-party actor may attempt to initiate a transaction to withdraw a greater number of digital assets from a user account than would otherwise be allowed based on the old user account data showing that the user account has a greater number of digital assets than are currently held by the user account.

Thus, by verifying the freshness of the authenticated data structure 500, the pre-signed cryptographic rotation system 106 offers additional security that can prevent such fraudulent transactions. For example, the pre-signed cryptographic rotation system 106 can determine to reject a transaction request if the stored root hash does not equal the root hash of the authenticated data structure 500. Indeed, in determining that the stored root hash does not equal the root hash of the authenticated data structure 500, the pre-signed cryptographic rotation system 106 can determine that the authenticated data structure 500 has been falsified by a third-party actor.

Figure 6:
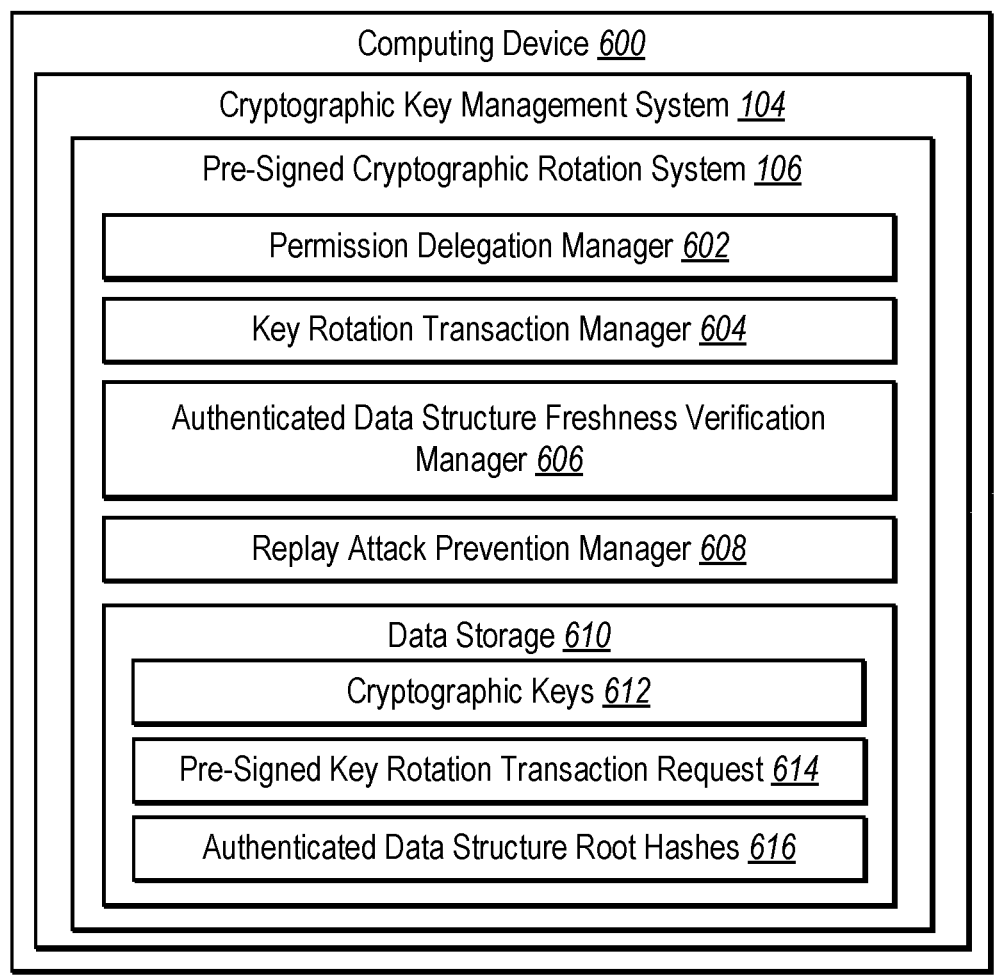
FIG. 6 illustrates an example schematic diagram of a pre-signed cryptographic rotation system in accordance with one or more embodiments.

Turning now to FIG. 6, additional detail will be provided regarding various components and capabilities of the pre-signed cryptographic rotation system 106. In particular, FIG. 6 illustrates the pre-signed cryptographic rotation system 106 implemented by a computing device 600 (e.g. the server(s) 102 and/or the client device 110 discussed above with reference to FIG. 1). Additionally, the pre-signed cryptographic rotation system 106 is also part of the cryptographic key management system 104. As shown, the pre-signed cryptographic rotation system 106 can include, but is not limited to, a permission delegation manager 602, a key rotation transaction manager 604, an authenticated data structure freshness verification manager 606, a replay attack prevention manager 608, and data storage 610 (which includes cryptographic keys 612, a pre-signed key rotation transaction request 614, and authenticated data structure root hashes 616).

As just mentioned, and as illustrated in FIG. 6, the pre-signed cryptographic rotation system 106 includes the permission delegation manager 602. In one or more embodiments, the permission delegation manager 602 delegates a permission to rotate the cryptographic keys of a first user account of a distributed digital ledger transaction network to a second user account of the distributed digital ledger transaction network. In particular, the permission delegation manager 602 can initiate a transaction delegating the permission to rotate the cryptographic keys to the second user account. In some instances, the permission delegation manager 602 initiates the transaction by submitting a corresponding transaction request to the distributed digital ledger transaction network.

Additionally, as shown in FIG. 6, the pre-signed cryptographic rotation system 106 includes the key rotation transaction manager 604. In particular, the key rotation transaction manager 604 can initiate key rotation transactions for rotating one or more cryptographic keys of a user account of the distributed digital ledger transaction network. To illustrate, the key rotation transaction manager 604 can utilize the cryptographic key of second user account, having been delegated a permission to rotate the cryptographic keys of a first user account, to generate a pre-signed key rotation transaction request for generating a modified cryptographic key that can be provided to the first user account in rotating its cryptographic keys. The key rotation transaction manager 604 can further store the pre-signed key rotation transaction request in a digital data storage location, such as one having a relatively low data retrieval time. Additionally, the key rotation transaction manager 604 can retrieve the pre-signed key rotation transaction request from the digital data storage location to initiate a key rotation transaction via the distributed digital ledger transaction network.

Further, as shown in FIG. 6, the pre-signed cryptographic rotation system 106 includes the authenticated data structure freshness verification manager 606. In particular, the authenticated data structure freshness verification manager 606 can verify that an authenticated data structure that stores user account data and is maintained by the distributed digital ledger transaction network is accurate and up-to-date. For example, the authenticated data structure freshness verification manager 606 can store (e.g., locally) the root hash of an authenticated data structure storing user account data (e.g., user account balances). In some implementations, the authenticated data structure freshness verification manager 606 updates the stored root hash after every transaction or every set of transactions executed and committed by the distributed digital ledger transaction network. Accordingly, the authenticated data structure freshness verification manager 606 can compare the stored root hash with the root hash of the authenticated data structure to verify that the authenticated data structure has not been altered (e.g., by a malicious third-party actor). For example, the authenticated data structure freshness verification manager 606 can compare the stored root hash with the root hash of the authenticated data structure when generating (or receiving) a transaction request.

As shown in FIG. 6, the pre-signed cryptographic rotation system 106 also includes the replay attack prevention manager 608. In particular, the replay attack prevention manager 608 can prevent the iterative replay of a previously-authorized transaction by determining whether or not a transaction request was previously processed (e.g., signed and submitted to the distributed digital ledger transaction network). To illustrate, in some embodiments, the replay attack prevention manager 608 stores (e.g., locally) the root hash of an authenticated data structure that stores transaction information and is maintained by the distributed digital ledger transaction network. The replay attack prevention manager 608 can update the stored root hash after every transaction or every set of transactions executed and committed by the distributed digital ledger transaction network. Upon determining that a transaction request has been received, the replay attack prevention manager 608 can compare the stored root hash with the root hash of the authenticated data structure to determine whether the authenticated data structure is accurate (e.g., can be trusted). If determined to be accurate, the replay attack prevention manager 608 can search the authenticated data structure to determine whether the received transaction request has already by processed (e.g., by looking for the transaction identifier of the transaction request within the authenticated data structure).

Additionally, as shown in FIG. 6, the pre-signed cryptographic rotation system 106 includes data storage 610. In particular, data storage 610 includes cryptographic keys 612, the pre-signed key rotation transaction request 614, and authenticated data structure root hashes 616. In one or more embodiments, cryptographic keys 612 stores one or more cryptographic keys of a user account. For example, cryptographic keys 612 can store an active cryptographic key for the user account (e.g., the cryptographic key that is currently valid for signing transaction requests or verification of the user account). The pre-signed key rotation transaction request 614 can store a pre-signed key rotation transaction request generated for a first user account using the cryptographic key of a second user account having a permission to rotate the cryptographic keys of the first user account. Authenticated data structure root hashes 616 can store the root hash of one or more authenticated data structures maintained by the distributed digital ledger transaction network.

Each of the components 602-616 of the pre-signed cryptographic rotation system 106 can include software, hardware, or both. For example, the components 602-616 can include one or more instructions stored on a computer-readable storage medium and executable by processors of one or more computing devices, such as a client device or server device. When executed by the one or more processors, the computer-executable instructions of the pre-signed cryptographic rotation system 106 can cause the computing device(s) to perform the methods described herein. Alternatively, the components 602-616 can include hardware, such as a special-purpose processing device to perform a certain function or group of functions. Alternatively, the components 602-616 of the pre-signed cryptographic rotation system 106 can include a combination of computer-executable instructions and hardware.

Furthermore, the components 602-616 of the pre-signed cryptographic rotation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-616 of the pre-signed cryptographic rotation system 106 may be implemented as a stand-alone application, such as a desktop or mobile application. Furthermore, the components 602-616 of the pre-signed cryptographic rotation system 106 may be implemented as one or more web-based applications hosted on a remote server. Alternatively, or additionally, the components 602-616 of the pre-signed cryptographic rotation system 106 may be implemented in a suite of mobile device applications or "apps."

Figure 7:
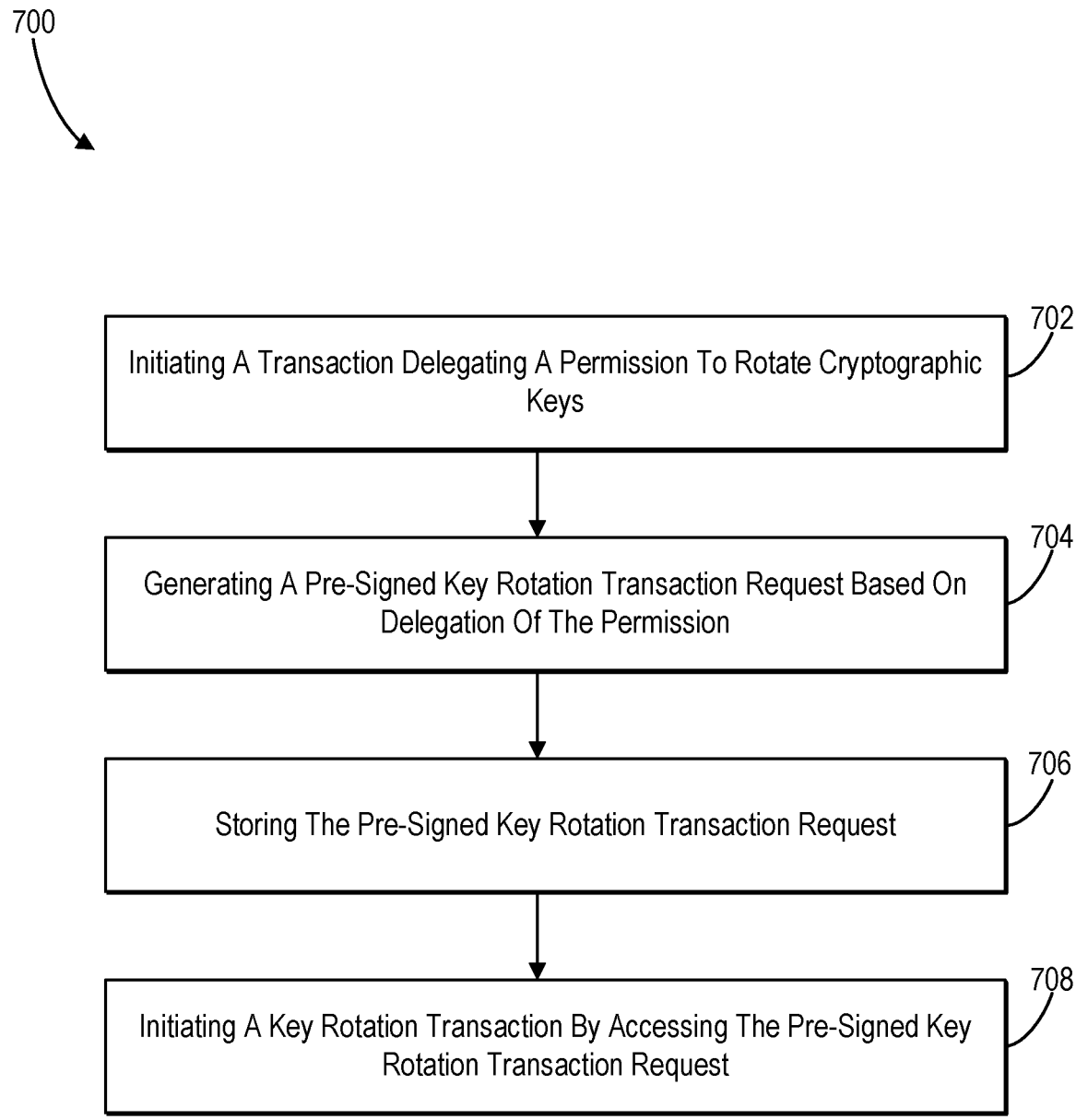
FIG. 7 illustrates a flowchart of a series of acts for utilizing a pre-signed key rotation transaction request to initiate a key rotation transaction for a user account in accordance with one or more embodiments.

FIGS. 1-6, the corresponding text and the examples provide a number of different methods, systems, devices, and non-transitory computer-readable media of the pre-signed cryptographic rotation system 106. In addition to the foregoing, one or more embodiments can also be described in terms of flowcharts comprising acts for accomplishing particular results, as shown in FIG. 7. FIG. 7 may be performed with more or fewer acts. Further, the acts may be performed in different orders. Additionally, the acts described herein may be repeated or performed in parallel with one another or in parallel with different instances of the same or similar acts.

FIG. 7 illustrates a flowchart of a series of acts 700 for utilizing a pre-signed key rotation transaction request to initiate a key rotation transaction for a user account in accordance with one or more embodiments. While FIG. 7 illustrates acts according to one embodiment, alternative embodiments may omit, add to, reorder, and/or modify any of the acts shown in FIG. 7. In some implementations, the acts of FIG. 7 are performed as part of a method. Alternatively, a non-transitory computer-readable medium can store instructions thereon that, when executed by at least one processor, cause a computing device to perform the acts of FIG. 7. In some embodiments, a system performs the acts of FIG. 7. For example, in one or more embodiments, a system includes at least one processor. The system can further include a non-transitory computer-readable medium comprising instructions that, when executed by the at least one processor, cause the system to perform the acts of FIG. 7.

The series of acts 700 includes an act 702 of initiating a transaction delegating a permission to rotate cryptographic keys. For example, the act 702 can involve initiating a transaction, via a distributed digital ledger transaction network, delegating a permission to rotate cryptographic keys of a first user account of the distributed digital ledger transaction network to a second user account of the distributed digital ledger transaction network. In some cases, initiating the transaction delegating the permission to rotate the cryptographic keys of the first user account of the distributed digital ledger transaction network to the second user account of the distributed digital ledger transaction network comprises: generating a transaction request corresponding to the transaction utilizing the active cryptographic key for the first user account; and submitting the transaction request to the distributed digital ledger transaction network for delegation of the permission to the second user account.

The series of acts 700 also includes an act 704 of generating a pre-signed key rotation transaction request based on delegation of the permission. For example, the act 704 can involve generating, utilizing a cryptographic key of the second user account, a pre-signed key rotation transaction request to generate a modified cryptographic key for the first user account based on delegation of the permission to the second user account. In some implementations, generating the pre-signed key rotation transaction request to exchange the active cryptographic key for the first user account to the modified cryptographic key for the first user account comprises generating a non-expiring pre-signed key rotation transaction request to exchange the active cryptographic key for the first user account to the modified cryptographic key for the first user account.

Further, the series of acts 700 includes an act 706 of storing the pre-signed key rotation transaction request. For example, the act 706 can involve storing the pre-signed key rotation transaction request in a first digital data storage location that is different than a second digital data storage location storing the cryptographic key of the second user account.

In one or more embodiments, the second digital data storage location storing the cryptographic key of the second user account comprises a cold storage location associated with a first data retrieval time; and storing the pre-signed key rotation transaction request in the first digital data storage location that is different than the second digital data storage location comprises storing the pre-signed key rotation transaction request in a digital data storage location associated with a second data retrieval time that is less than the first data retrieval time.

Additionally, the series of acts 700 includes an act 708 of initiating a key rotation transaction by accessing the pre-signed key rotation transaction request. For example, the act 708 can involve initiating a key rotation transaction, via the distributed digital ledger transaction network, exchanging an active cryptographic key for the first user account to the modified cryptographic key for the first user account by accessing the pre-signed key rotation transaction request from the second digital data storage location.

In one or more embodiments, the pre-signed cryptographic rotation system 106 initiates the key rotation transaction, via the distributed digital ledger transaction network, in response to determining that a third-party actor unassociated with the first user account or the second user account has accessed at least one cryptographic key for the first user account. For example, in some embodiments, determining that the third-party actor unassociated with the first user account or the second user account has accessed the at least one cryptographic key for the first user account comprises determining that the third-party actor has initiated an exchange of a first cryptographic key for the first user account to the active cryptographic key for the first user account. In some cases, the pre-signed cryptographic rotation system 106 initiates the key rotation transaction based on a predetermined time for rotating the active cryptographic key of the first user account.

In one or more embodiments, the series of acts 700 further includes acts for utilizing the modified cryptographic key. For example, in some implementations, the acts include initiating a subsequent transaction, via the distributed digital ledger transaction network, utilizing the modified cryptographic key for the first user account after the modified cryptographic key becomes active for the first user account based on a consensus of the key rotation transaction via the distributed digital ledger transaction network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
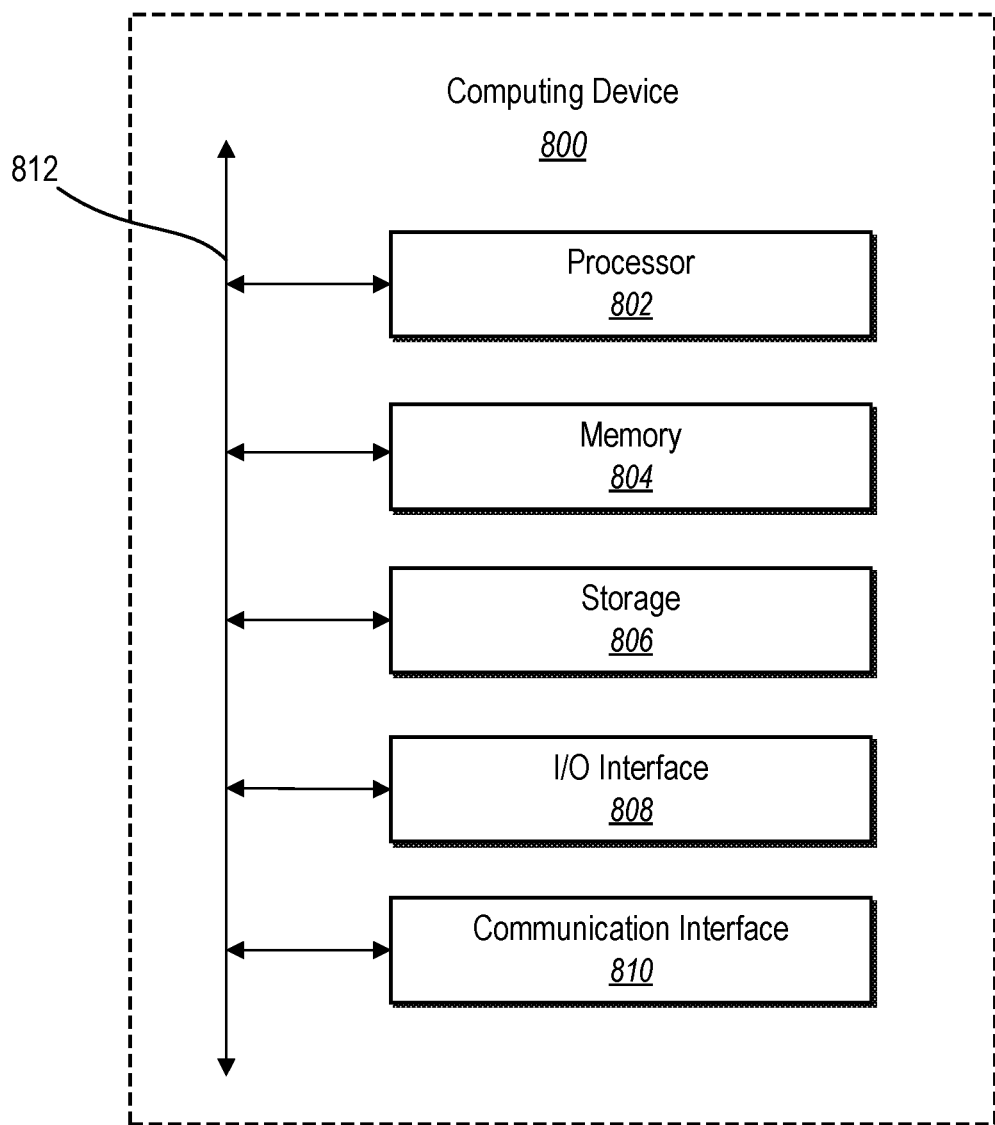
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 102, the client devices 110a-110n, and or the computing devices of the distributed digital ledger transaction network 114). In one or more embodiments, the computing device 800 may be a mobile device (e.g., a mobile telephone, a smartphone, a PDA, a tablet, a laptop, a camera, a tracker, a watch, a wearable device). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 including storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   initiating a transaction, via a distributed digital ledger transaction network, delegating a permission to rotate cryptographic keys of a first user account of the distributed digital ledger transaction network to a second user account of the distributed digital ledger transaction network;
   generating, utilizing a cryptographic key of the second user account, a pre-signed key rotation transaction request to generate a modified cryptographic key for the first user account based on delegation of the permission to the second user account;

storing the pre-signed key rotation transaction request in a first digital data storage location that is different than a second digital data storage location of a memory device storing the cryptographic key of the second user account; and initiating a key rotation transaction, via the distributed digital ledger transaction network, exchanging an active cryptographic key for the first user account to the modified cryptographic key for the first user account by accessing the pre-signed key rotation transaction request from the second digital data storage location of the memory device.

2. The method of claim 1, further comprising initiating the key rotation transaction, via the distributed digital ledger transaction network, in response to determining that a third-party actor unassociated with the first user account or the second user account has accessed at least one cryptographic key for the first user account.

3. The method of claim 2, wherein determining that the third-party actor unassociated with the first user account or the second user account has accessed the at least one cryptographic key for the first user account comprises determining that the third-party actor has initiated an exchange of a first cryptographic key for the first user account to the active cryptographic key for the first user account.

4. The method of claim 1, further comprising initiating the key rotation transaction based on a predetermined time for rotating the active cryptographic key of the first user account.

5. The method of claim 1, wherein:
the second digital data storage location storing the cryptographic key of the second user account comprises a cold storage location associated with a first data retrieval time; and
storing the pre-signed key rotation transaction request in the first digital data storage location that is different than the second digital data storage location comprises storing the pre-signed key rotation transaction request in a digital data storage location associated with a second data retrieval time that is less than the first data retrieval time.

6. The method of claim 1, wherein generating the pre-signed key rotation transaction request to exchange the active cryptographic key for the first user account to the modified cryptographic key for the first user account comprises generating a non-expiring pre-signed key rotation transaction request to exchange the active cryptographic key for the first user account to the modified cryptographic key for the first user account.

7. The method of claim 1, wherein initiating the transaction delegating the permission to rotate the cryptographic keys of the first user account of the distributed digital ledger transaction network to the second user account of the distributed digital ledger transaction network comprises:
generating a transaction request corresponding to the transaction utilizing the active cryptographic key for the first user account; and
submitting the transaction request to the distributed digital ledger transaction network for delegation of the permission to the second user account.

8. The method of claim 1, further comprising initiating a subsequent transaction, via the distributed digital ledger transaction network, utilizing the modified cryptographic key for the first user account after the modified cryptographic key becomes active for the first user account based on a consensus of the key rotation transaction via the distributed digital ledger transaction network.

9. A non-transitory computer-readable medium storing instructions thereon that, when executed by at least one processor, cause a computing device to:
initiate a transaction, via a distributed digital ledger transaction network, delegating a permission to rotate cryptographic keys of a first user account of the distributed digital ledger transaction network to a second user account of the distributed digital ledger transaction network;
generate, utilizing a cryptographic key of the second user account, a pre-signed key rotation transaction request to generate a modified cryptographic key for the first user account based on delegation of the permission to the second user account;
store the pre-signed key rotation transaction request in a first digital data storage location that is different than a second digital data storage location of a memory device storing the cryptographic key of the second user account; and
initiate a key rotation transaction, via the distributed digital ledger transaction network, exchanging an active cryptographic key for the first user account to the modified cryptographic key for the first user account by accessing the pre-signed key rotation transaction request from the second digital data storage location of the memory device.

10. The non-transitory computer-readable medium of claim 9, further comprising instructions that, when executed by the at least one processor, cause the computing device to initiate the key rotation transaction, via the distributed digital ledger transaction network, in response to determining that a third-party actor unassociated with the first user account or the second user account has accessed at least one cryptographic key for the first user account.

11. The non-transitory computer-readable medium of claim 10, wherein determining that the third-party actor unassociated with the first user account or the second user account has accessed the at least one cryptographic key for the first user account comprises determining that the third-party actor has initiated an exchange of a first cryptographic key for the first user account to the active cryptographic key for the first user account.

12. The non-transitory computer-readable medium of claim 9, further comprising instructions that, when executed by the at least one processor, cause the computing device to initiate the key rotation transaction based on a predetermined time for rotating the active cryptographic key of the first user account.

13. The non-transitory computer-readable medium of claim 9,
wherein the second digital data storage location storing the cryptographic key of the second user account comprises a cold storage location associated with a first data retrieval time; and
further comprising instructions that, when executed by the at least one processor, cause the computing device to store the pre-signed key rotation transaction request in the first digital data storage location that is different than the second digital data storage location by storing the pre-signed key rotation transaction request in a digital data storage location associated with a second data retrieval time that is less than the first data retrieval time.

14. The non-transitory computer-readable medium of claim 9, further comprising instructions that, when executed by the at least one processor, cause the computing device to generate the pre-signed key rotation transaction request to exchange the active cryptographic key for the first user account to the modified cryptographic key for the first user account by generating a non-expiring pre-signed key rotation transaction request to exchange the active cryptographic key for the first user account to the modified cryptographic key for the first user account.

15. The non-transitory computer-readable medium of claim 9, further comprising instructions that, when executed by the at least one processor, cause the computing device to initiate the transaction delegating the permission to rotate the cryptographic keys of the first user account of the distributed digital ledger transaction network to the second user account of the distributed digital ledger transaction network by:
 generating a transaction request corresponding to the transaction utilizing the active cryptographic key for the first user account; and
 submitting the transaction request to the distributed digital ledger transaction network for delegation of the permission to the second user account.

16. The non-transitory computer-readable medium of claim 9, further comprising instructions that, when executed by the at least one processor, cause the computing device to initiate a subsequent transaction, via the distributed digital ledger transaction network, utilizing the modified cryptographic key for the first user account after the modified cryptographic key becomes active for the first user account based on a consensus of the key rotation transaction via the distributed digital ledger transaction network.

17. A system comprising:
 at least one processor; and
 a non-transitory computer-readable medium comprising instructions that, when executed by the at least one processor, cause the system to:
  initiate a transaction, via a distributed digital ledger transaction network, delegating a permission to rotate cryptographic keys of a first user account of the distributed digital ledger transaction network to a second user account of the distributed digital ledger transaction network;
  generate, utilizing a cryptographic key of the second user account, a pre-signed key rotation transaction request to generate a modified cryptographic key for the first user account based on delegation of the permission to the second user account;
  store the pre-signed key rotation transaction request in a first digital data storage location that is different than a second digital data storage location of a memory device storing the cryptographic key of the second user account; and
  initiate a key rotation transaction, via the distributed digital ledger transaction network, exchanging an active cryptographic key for the first user account to the modified cryptographic key for the first user account by accessing the pre-signed key rotation transaction request from the second digital data storage location of the memory device.

18. The system of claim 17, further comprising instructions that, when executed by the at least one processor, cause the system to initiate the key rotation transaction, via the distributed digital ledger transaction network, in response to determining that a third-party actor unassociated with the first user account or the second user account has accessed at least one cryptographic key for the first user account.

19. The system of claim 18, wherein determining that the third-party actor unassociated with the first user account or the second user account has accessed the at least one cryptographic key for the first user account comprises determining that the third-party actor has initiated an exchange of a first cryptographic key for the first user account to the active cryptographic key for the first user account.

20. The system of claim 17, further comprising instructions that, when executed by the at least one processor, cause the system to initiate the key rotation transaction based on a predetermined time for rotating the active cryptographic key of the first user account.

\* \* \* \* \*